United States Patent
Lentz et al.

(10) Patent No.: US 12,442,949 B2
(45) Date of Patent: Oct. 14, 2025

(54) TESTING APPARATUS AND METHODS FOR MEASURING FORCES BETWEEN OBJECTS

(71) Applicant: Unspace, LLC, Houston, TX (US)

(72) Inventors: Phillip Scott Lentz, Port Aransas, TX (US); Benjamin Peters, Houston, TX (US); Kevin Stephens, Houston, TX (US); Evan Laske, League City, TX (US)

(73) Assignee: Unspace, LLC, Houston, TX (US)

( * ) Notice: Subject to any disclaimer, the term of this patent is extended or adjusted under 35 U.S.C. 154(b) by 592 days.

(21) Appl. No.: 17/864,090

(22) Filed: Jul. 13, 2022

(65) Prior Publication Data

US 2024/0019601 A1    Jan. 18, 2024

(51) Int. Cl.
*G01V 7/12*     (2006.01)
*G01V 7/06*     (2006.01)
*G04F 5/14*     (2006.01)

(52) U.S. Cl.
CPC .................. *G01V 7/12* (2013.01); *G01V 7/06* (2013.01); *G04F 5/14* (2013.01)

(58) Field of Classification Search
CPC ............... G01V 7/12; G01V 7/06; G04F 5/14
See application file for complete search history.

(56) References Cited

U.S. PATENT DOCUMENTS

| | | | |
|---|---|---|---|
| 3,336,806 A | 8/1967 | Kalmus | |
| 3,599,492 A | 8/1971 | Kalmus et al. | |
| 6,134,258 A | 10/2000 | Tulloch et al. | |
| 8,066,226 B2 | 11/2011 | Fiala et al. | |
| 10,302,808 B2 | 5/2019 | Chiao | |
| 11,384,727 B2 | 7/2022 | Sheldon-Coulson et al. | |
| 2017/0304894 A1 | 10/2017 | Buller | |

(Continued)

FOREIGN PATENT DOCUMENTS

| CN | 102158289 A | 8/2011 |
|---|---|---|
| WO | 2019129746 A1 | 7/2019 |

OTHER PUBLICATIONS

3B Scientific Physics—Cavendish Torsion Balance (Year: 2018).*

(Continued)

*Primary Examiner* — David Z Huang
(74) *Attorney, Agent, or Firm* — Patterson + Sheridan, LLP

(57) ABSTRACT

Aspects of the present disclosure relate to testing apparatus and methods for measuring forces between objects. The apparatus and methods are used to detect a change in the local gravitational constant resulting from non-Newtonian effects of General Relativity and/or a novel radial dilation influence. Detection is facilitated by measuring a force difference between a stationary state and a spinning state of attractive forces between objects. The apparatus and methods are used to detect a change in electromechanical influence of forces due to the Barnett affect and other anomalous electromagnetic force contributors. A testing apparatus includes a central target arrangement. The central target arrangement includes a pair of masses, and a target coupled to the pair of masses. The testing apparatus includes a detector configured to recognize the target, and a first rotatable mass. The first rotatable mass is supported independently of the target and the pair of target masses.

27 Claims, 25 Drawing Sheets

(56) References Cited

U.S. PATENT DOCUMENTS

2020/0371269 A1 11/2020 Margaritova et al.
2022/0117837 A1 4/2022 Northen et al.

OTHER PUBLICATIONS

Leybold Didactic GmbH—Gravitation Torsion balance Instruction Sheet, dated using WaybackMachine—https://web.archive.org/web/20201101122124/https://www.leybold-shop.com/physics/physics-equipment/mechanics/rotational-motion/gravitation-torsion-balance/gravitation-torsion-balance-332101.html (Year: 2020).*

"Gravitational Torsion Balance, AP-8215A", Instruction Manual with Experimental Guide and Teachers' Notes 012-11032D, Pasco, pp. 1-18.

Rothleitner, C. et al., "Invited Review Article: Measurements of the Newtonian constant of gravitation, G", Review of Scientific Instruments, vol. 88, Issue 11, 2017, pp. 1-27, <https://aip.scitation.org/doi/10.1063/1.4994619>.

"Gravitational Waves", TAPIR at Caltech, <http://www.tapir.caltech.edu/~teviet/Waves/gwave.html>.

He, Zhongfu et al., "Capacitive Pressure Sensor with High Sensitivity and Fast Response to Dynamic Interaction Based on Graphene and Porous Nylon Networks", ACS Publications, 2018, pp. 12816-12823, <https://pubs.acs.org/doi/abs/10.1021/acsami.8b01050>.

Waters, Richard L. et al., "Electro-Optical Ultra Sensitive Accelerometer", Space and Naval Warfare Systems Center, 2002, pp. 1-10, <https://apps.dtic.mil/sti/citations/ADA506920>.

Goetz, E. et al., "Coherently combining data between detectors for all-sky semi-coherent continuous gravitational wave searches", Classical and Quantum Gravity, vol. 33, No. 8, 2016, <https://iopscience.iop.org/article/10.1088/0264-9381/33/8/085007>.

International Search Report and Written Opinion dated Jan. 11, 2024 for Application No. PCT/US2023/072036.

\* cited by examiner

TESTING APPARATUS AND METHODS FOR MEASURING FORCES BETWEEN OBJECTS

BACKGROUND

Field

Aspects of the present disclosure relate to testing apparatus and methods for measuring forces between objects. In one aspect, the apparatus and methods are used to detect a change in the local gravitational constant resulting from non-Newtonian effects of General Relativity and/or a novel radial dilation influence. Detection is facilitated by measuring a force difference between a stationary state and a spinning state of attractive forces between objects. In another aspect, the apparatus and methods are used to detect a change in electromechanical influence of forces due to the Barnett affect and other anomalous electromagnetic force contributors.

Description of the Related Art

Testing apparatus, such as measurement instrumentation, can fail to accurately measure a full range of forces between objects. Testing operations can also be affected by environmental factors. Additionally, testing apparatus can be complicated, inefficient, and limited in terms of modularity.

Therefore, there is a need for improved testing apparatus and related methods.

SUMMARY

Aspects of the present disclosure relate to testing apparatus and methods for measuring forces between objects. In one aspect, the apparatus and methods are used to detect a change in the local gravitational constant resulting from non-Newtonian effects of General Relativity and/or a novel radial dilation influence. Detection is facilitated by measuring a force difference between a stationary state and a spinning state of attractive forces between objects. In another aspect, the apparatus and methods are used to detect a change in electromechanical influence of forces due to the Barnett affect and other anomalous electromagnetic force contributors.

In one implementation, a testing apparatus includes a central target arrangement. The central target arrangement includes a pair of masses, and a target coupled to the pair of masses. The testing apparatus includes a detector configured to recognize the target, and a first rotatable mass. The first rotatable mass is supported independently of the target and the pair of target masses.

In one implementation, a testing apparatus includes a central target arrangement. The central target arrangement includes a pair of masses, and a target coupled to the pair of masses. The testing apparatus includes a detector configured to recognize the target, a stage, a first spinner tower comprising a first rotatable mass, and a second spinner tower that includes a second rotatable mass.

In one implementation, a method of detecting a radial dilation effect includes positioning one or more rotatable masses in a first position adjacent a central target arrangement comprising a target, and collecting stationary data regarding positioning of the target while the one or more rotatable masses are in a stationary state. The method includes rotating the one or more rotatable masses at a rotation speed, collecting spin data regarding positioning of the target while the one or more rotatable masses are in a spinning state, and comparing the spin data to the stationary data. The method includes determining a force difference between the stationary state and the spinning state.

BRIEF DESCRIPTION OF THE DRAWINGS

So that the manner in which the above-recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1A:
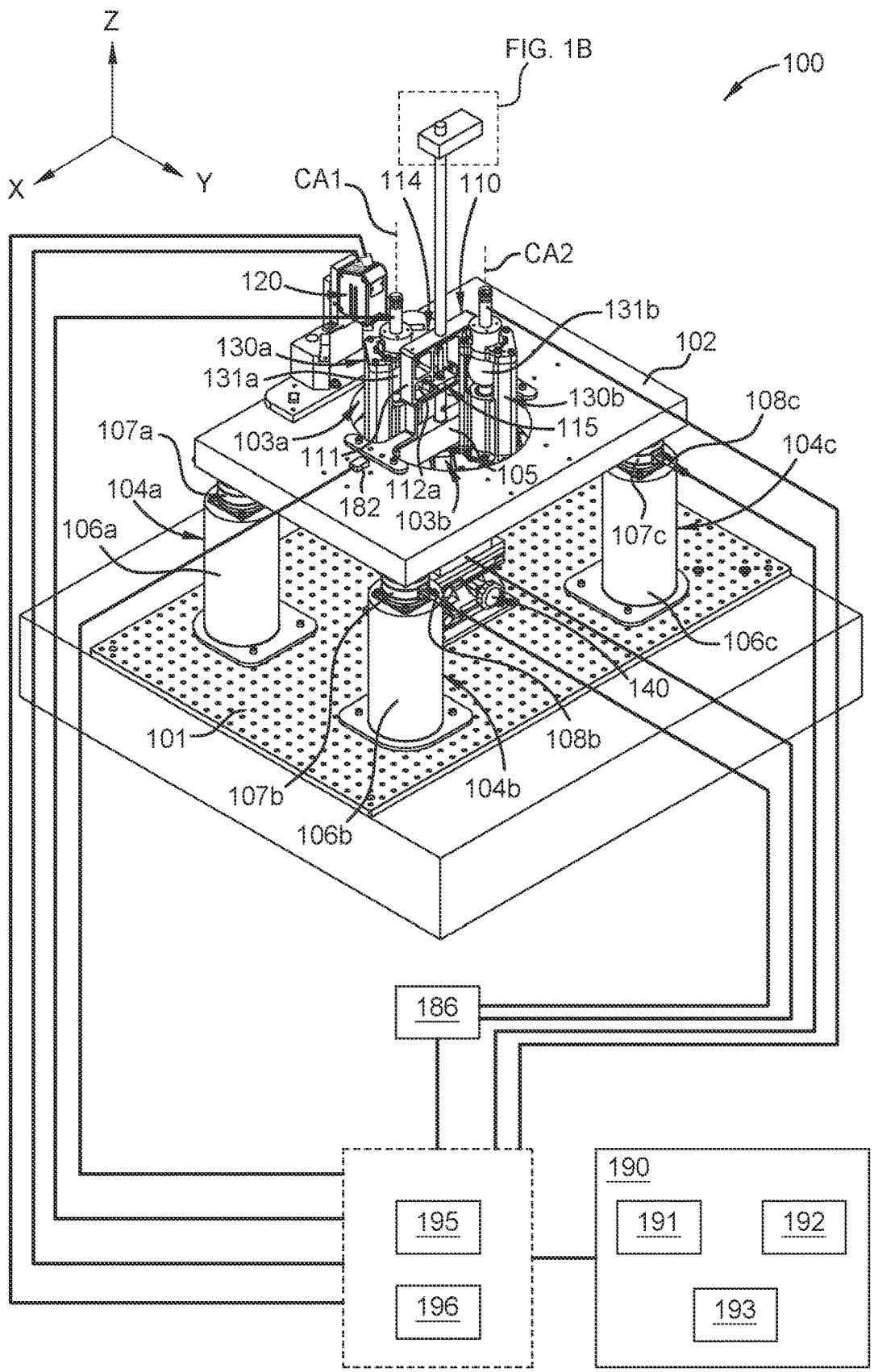
FIG. 1A is a schematic perspective front view of a testing apparatus, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to testing apparatus and methods. In one aspect, the apparatus and methods are used to detect changes in the gravitational constant related to nuances of the Theory of General Relativity and a novel radial dilation effect by determining a force difference between a stationary state and a spinning state of attractional forces between objects. In one implementation, a testing apparatus includes a central target arrangement. The central target arrangement includes a target housing, a pair of masses disposed within the target housing, and a target disposed within the target housing. The testing apparatus includes a detector configured to recognize the target, and a first rotatable mass disposed outside of the target housing of the central target arrangement. The first rotatable mass is supported independently of the target housing and the pair of target masses.

It is believed according to the present disclosure that masses rotating (e.g., spinning) at relatively high speeds (such as more than 1,000 rotations-per-minute, for example 6,000 rotations-per-minute, or up to 60,000 rotations-per-minute) produces an attractive force that is in addition to gravitational forces. The attractive force is referred to herein as a "radial dilation effect" or a "time dilation effect." The testing apparatus and methods described herein can measure the radial dilation effect under a variety of circumstances. The testing for the radial dilation effect can be used in a variety of applications, such as aircraft flight control and/or aerospace applications (such as satellite control).

Figure 2:
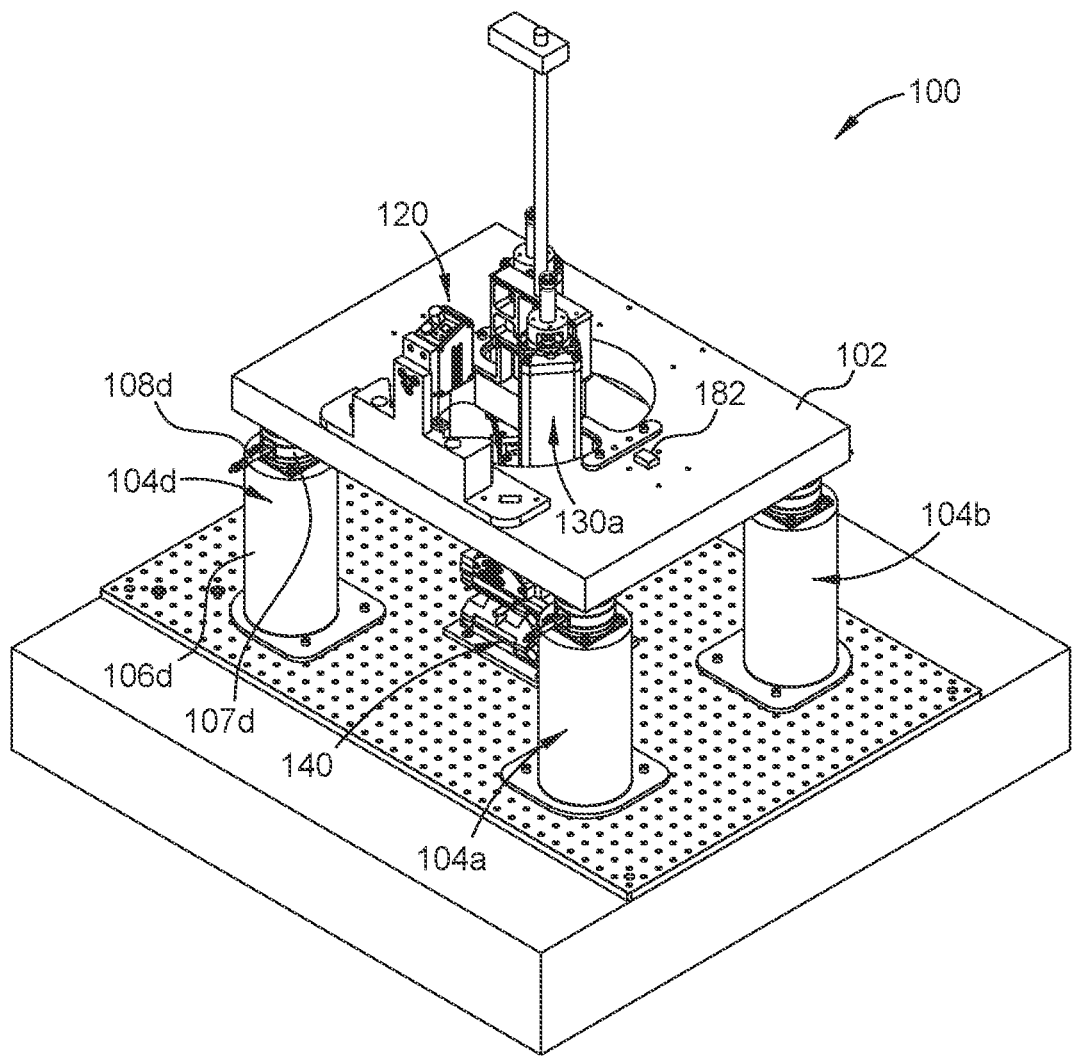
FIG. 2 is a schematic perspective back view of the testing apparatus shown in FIG. 1A, according to one implementation.
Figure 3:
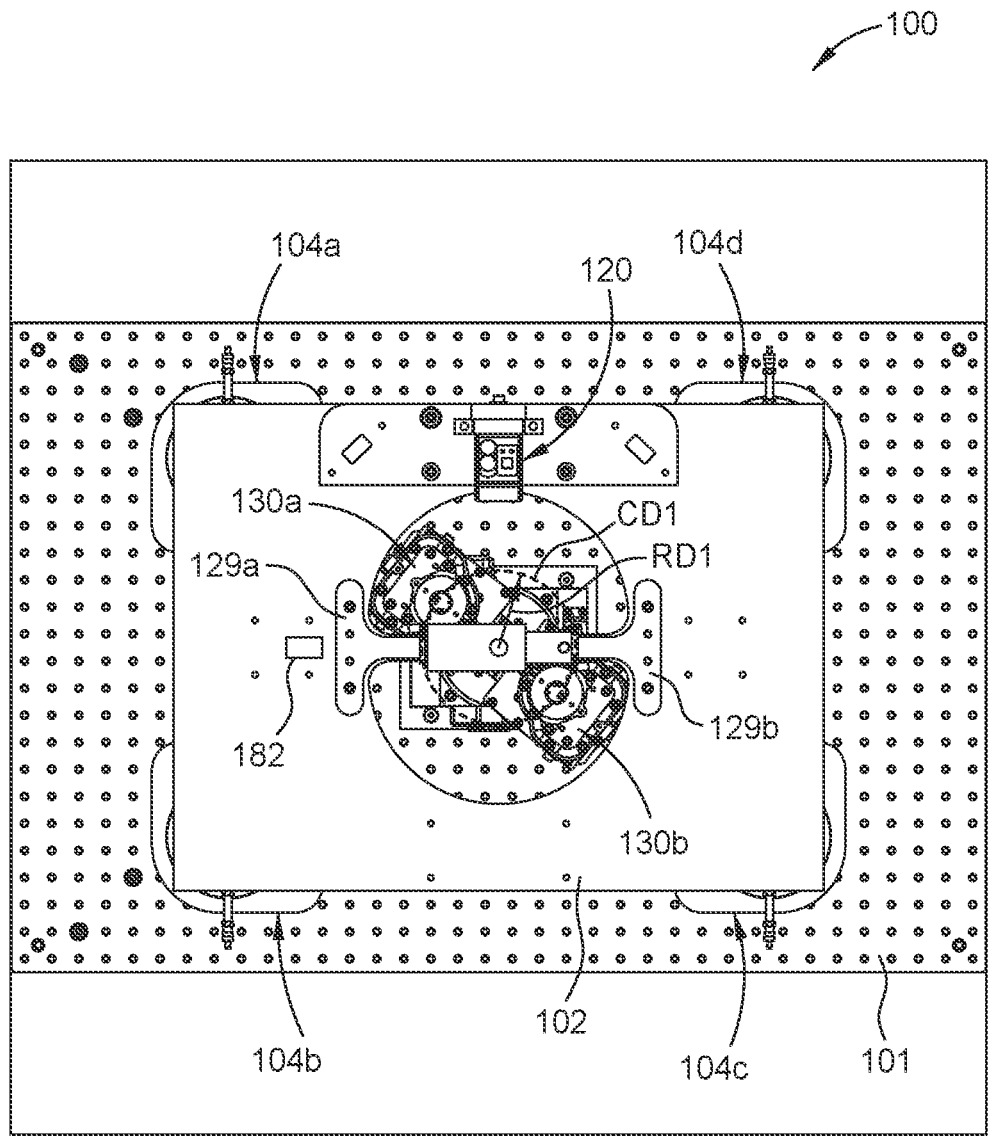
FIG. 3 is a schematic top view of the testing apparatus shown in FIG. 1A, according to one implementation.
Figure 4:
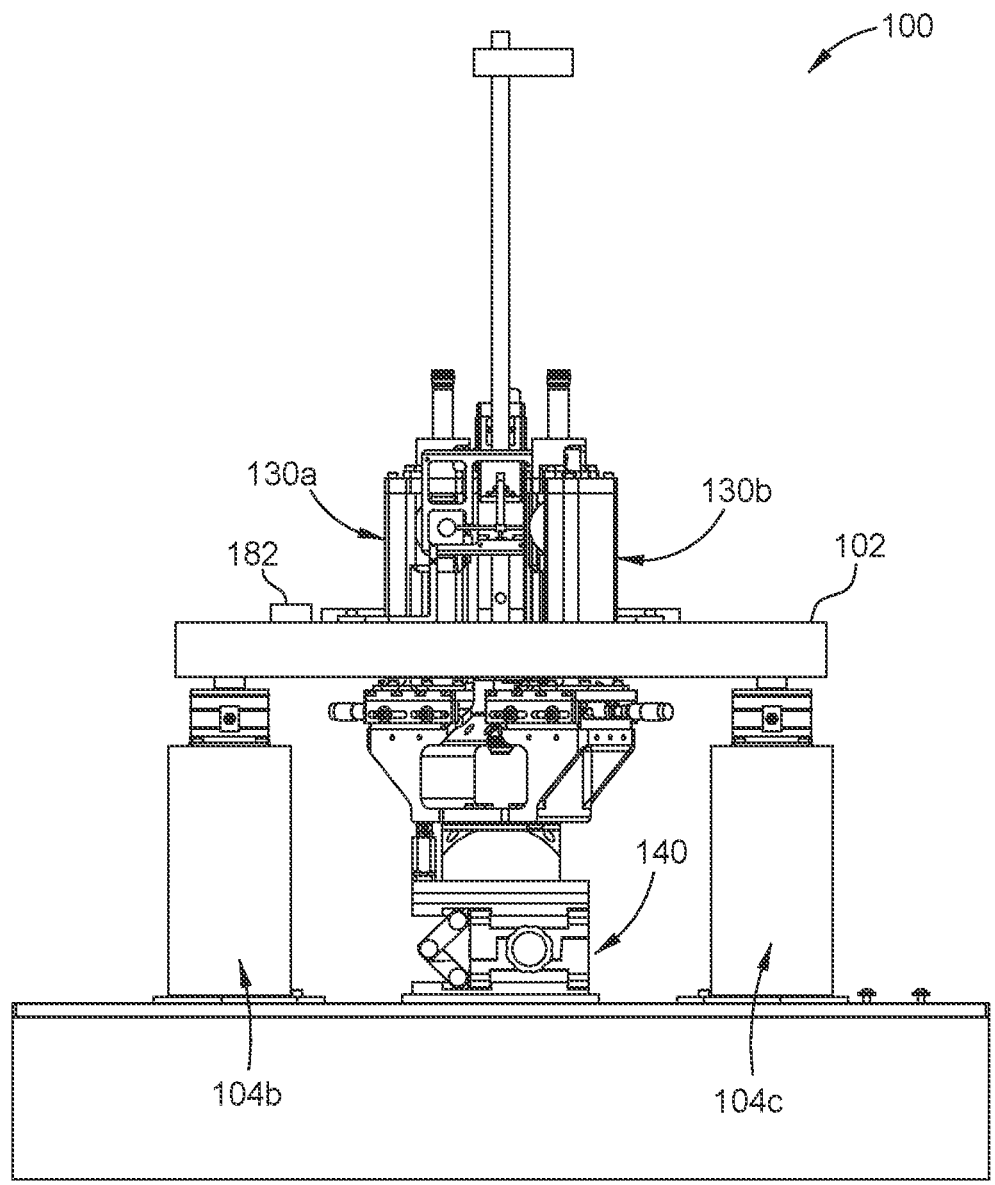
FIG. 4 is a schematic front view of the testing apparatus shown in FIG. 1A, according to one implementation.
Figure 5:
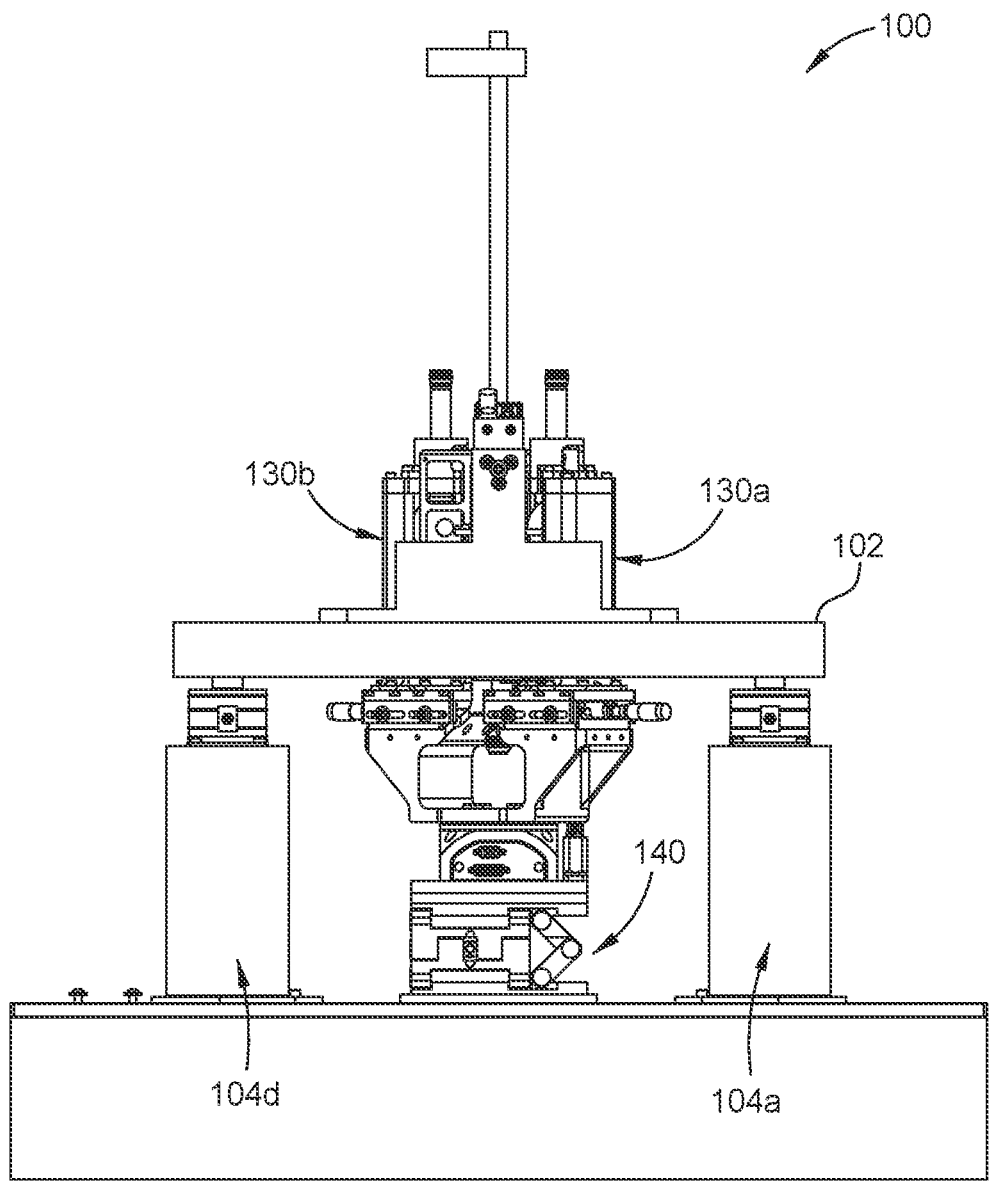
FIG. 5 is a schematic rear view of the testing apparatus shown in FIG. 1A, according to one implementation.
Figure 6:
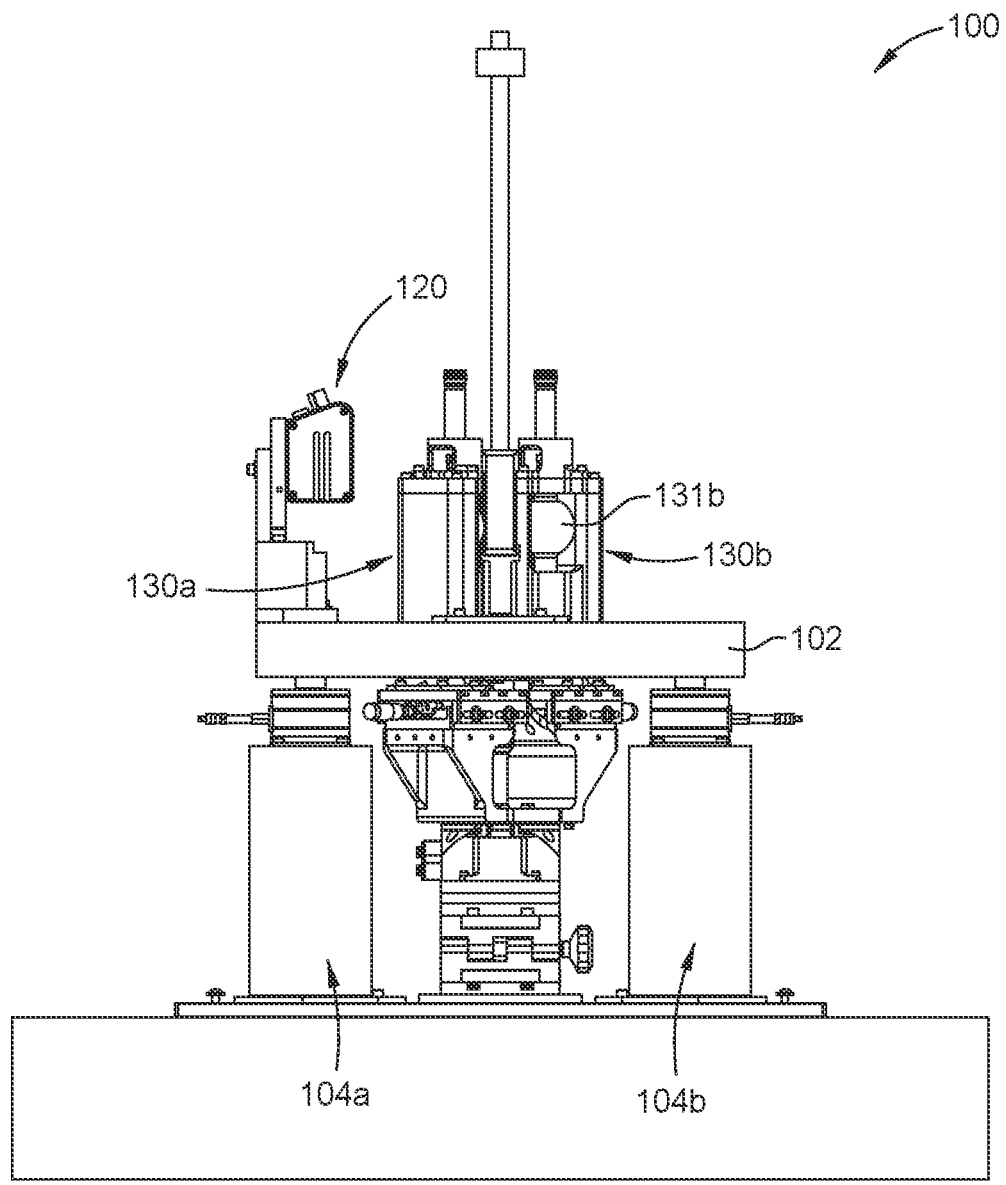
FIG. 6 is a schematic side view of a first side of the testing apparatus shown in FIG. 1A, according to one implementation.

FIG. 1A is a schematic perspective front view of a testing apparatus 100, according to one implementation. FIG. 2 is a schematic perspective back view of the testing apparatus 100 shown in FIG. 1A, according to one implementation. FIG. 3 is a schematic top view of the testing apparatus 100 shown in FIG. 1A, according to one implementation. FIG. 4 is a schematic front view of the testing apparatus 100 shown in FIG. 1A, according to one implementation. FIG. 5 is a schematic rear view of the testing apparatus 100 shown in FIG. 1A, according to one implementation. FIG. 6 is a schematic side view of a first side of the testing apparatus 100 shown in FIG. 1A, according to one implementation.

Figure 7:
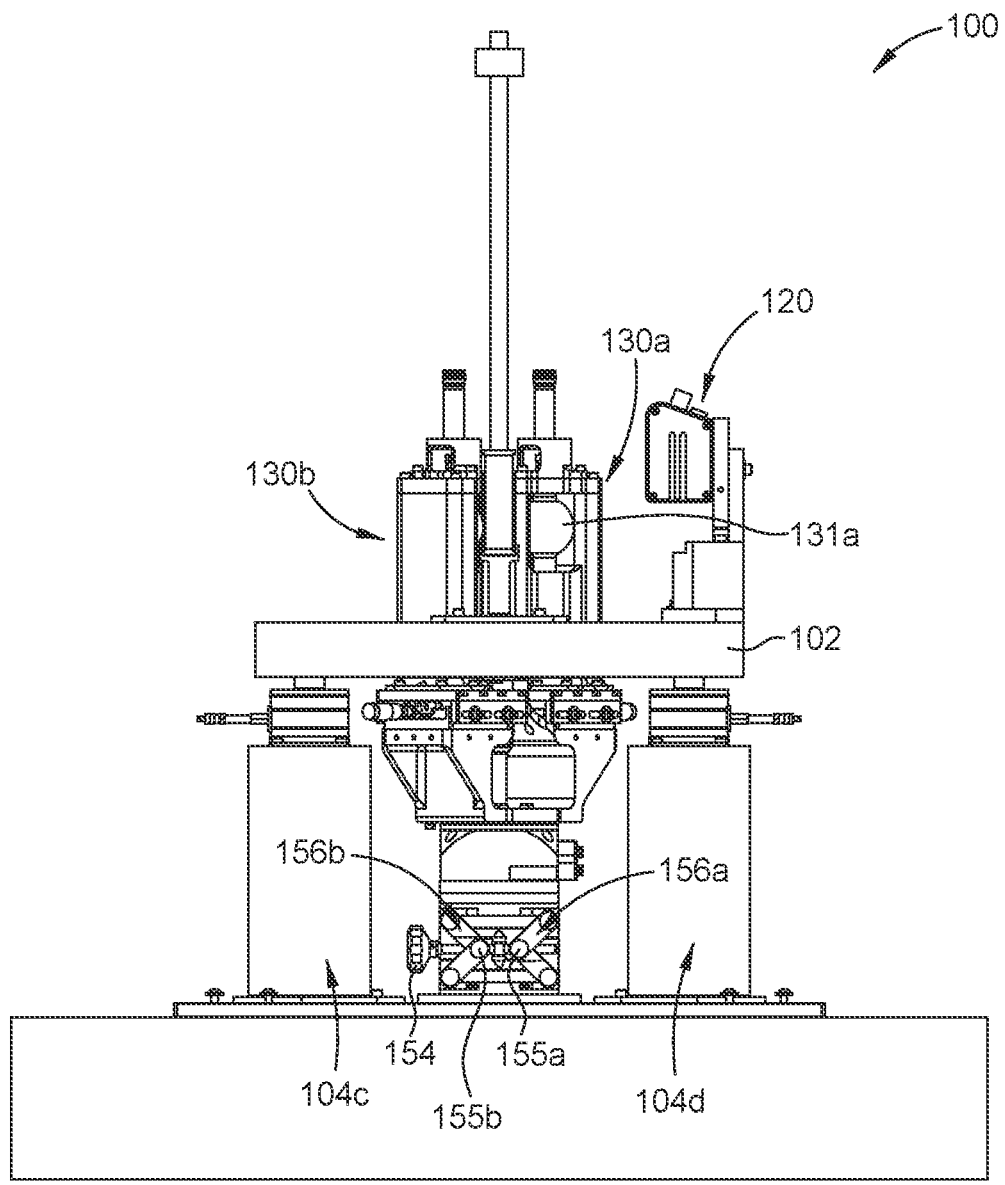
FIG. 7 is a schematic side view of a second side of the testing apparatus shown in FIG. 1A, according to one implementation.

FIG. 7 is a schematic side view of a second side of the testing apparatus 100 shown in FIG. 1A, according to one implementation.

With reference to FIGS. 1-7, the testing apparatus 100 includes a central target arrangement 110 and a detector 120. In one embodiment, which can be combined with other embodiments, the testing apparatus 100 is configured to include at least part of a Cavendish gravitational experiment configuration. The central target arrangement 110 includes a target housing 111. The testing apparatus 100 includes a first rotatable mass 131a disposed outside of the target housing 111, and a second rotatable mass 131b disposed outside of the target housing 111.

The first rotatable mass 131a is disposed outwardly of a first side 114 of the target housing 111, and the second rotatable mass 131b is disposed outwardly of a second side 115 of the target housing 111. The second side 115 is opposite of the first side 114. Each of the first rotatable mass 131a and the second rotatable mass 131b is rotatable about a respective central axis CA1, CA2 thereof.

The testing apparatus 100 includes a base 101, a table 102 mounted to the base 101 through a plurality of columns 104a-104d. Table 102 includes a first opening 103a, a second opening 103b, and a beam 105 separating the first opening 103a and the second opening 103b. The target housing 111 is mounted to the table 102 above the beam 105. The testing apparatus 100 includes a stage 140 mounted to the base 101, and the stage 140 is positioned inwardly of the plurality of columns 104a-104d. The components of the testing apparatus 100 can be formed of a metal (such as aluminum or stainless steel) or a polymer (such as a plastic).

Each of the columns 104a-104d includes a cylinder 106a-106d, a bellows 107a-107d, and a conduit 108a-108d for receiving and exhausting a fluid. The fluid includes a hydraulic fluid or a pneumatic fluid supplied from one or more fluid sources 186 (shown in FIG. 1A). Using the conduits 108a-108d, the fluid is supplied into and/or out of one or more of the bellows 107a-107d to bias the bellows 107a-107d and mitigate (e.g., dampen) the vibration of the table 102 and/or level the table 102. The mitigated vibration of the table 102 reduces or eliminates the transfer of vibration to the target 113 that results from the spinning of the rotatable masses 131a, 131b. The testing apparatus 100 can include one or more vibration sensors 182 (one is shown in FIGS. 1-4) that can sense vibrations of the various components of the testing apparatus 100. One vibration sensor 182 is shown in FIGS. 1-4 as mounted to the table 102. The present disclosure contemplates that vibration sensor(s) can be mounted to other components, such as the detector 120, the spinner towers 130a, 130b, the stage 140, and/or the target housing 111. As an example, vibration sensors on the spinner towers 130a, 130b can be used to measure movement of the spinner towers 130a, 130b, and the movement can be accounted for in the radial dilation effect determinations.

Various components of the testing apparatus can be coupled to wires that electrically ground the components. The electrical grounding facilitates removing electromagnetic forces and accurate measurements. As an example, one or more of the target housing 111, the spinner towers 130a, 130b, the detector 120, the table 102, and/or the stage 140 can be coupled to wires that electrically ground one or more of the target housing 111, the spinner towers 130a, 130b, the detector 120, the table 102, and/or the stage 140. The first rotatable mass 131a is part of a first spinner tower 130a coupled to the stage 140 and extending through the first opening 103a on the first side 114 of the target housing 111.

The second rotatable mass 131b is part of a second spinner tower 130b coupled to the stage 140 and extending through the second opening 103b on the second side 115 of the target housing 111.

Figure 1B:
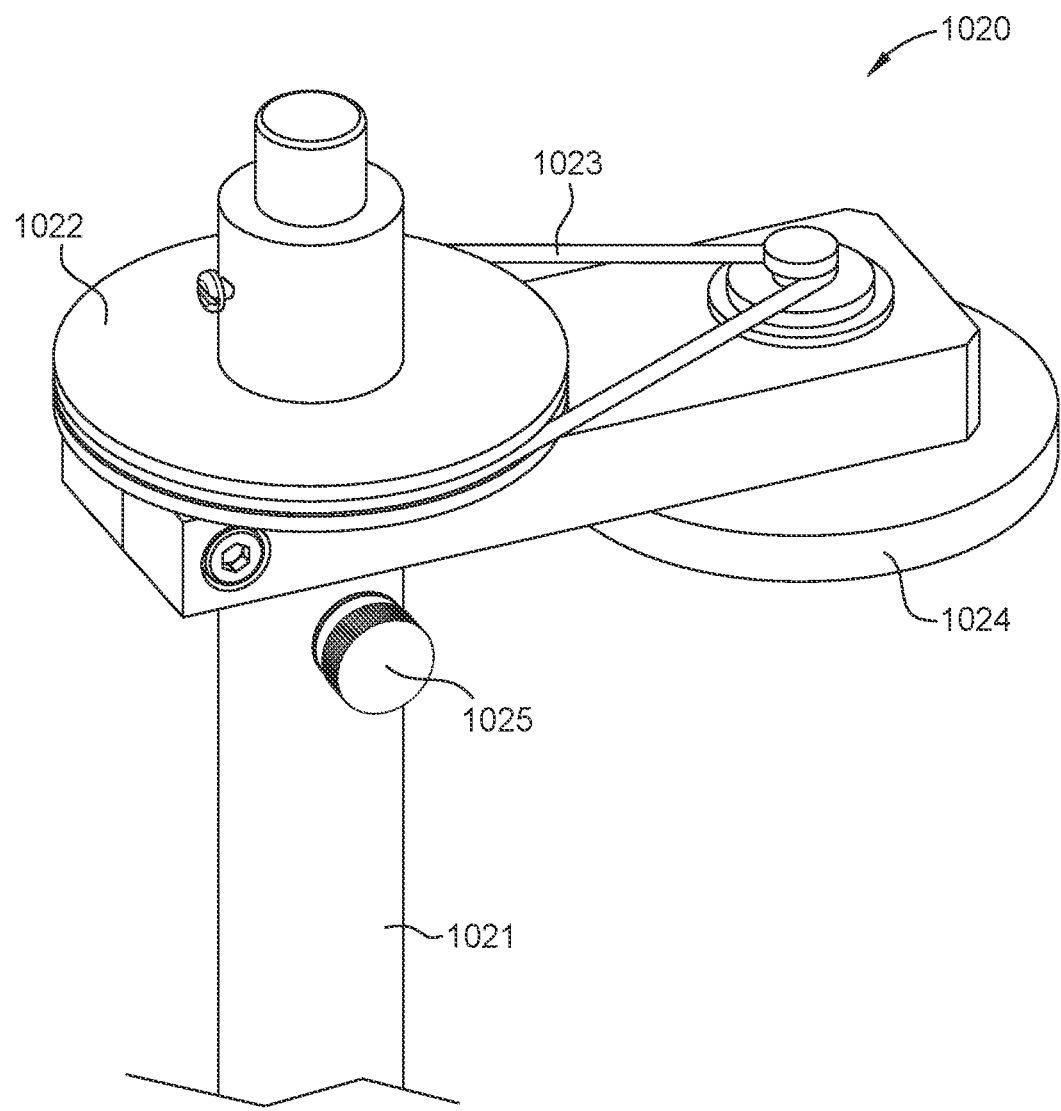
FIG. 1B is a schematic enlarged view of the testing apparatus shown in FIG. 1A, according to one implementation.

FIG. 1B is a schematic enlarged view of the testing apparatus 100 shown in FIG. 1A, according to one implementation. The testing apparatus 100 includes a wire support frame 1020 that is used to suspend the wire 117. The wire support frame 1020 includes a wire sleeve 1021, an adjustable wheel 1022, an adjustable line 1023, and a wheel knob 1024. The wire support frame 1020 includes a locking knob 1025. The locking knob 1025 can be turned to tighten and lock the wire 117 into a zero position (e.g., a position of the wire before spinning of the rotatable masses 131a, 131b spin to cause the force difference that can twist the wire 117). The zero position can be a zero angle. The locking knob 1025 can be turned in an opposite direction to loosen such that the zero position of the wire 117 can be adjusted (e.g., angularly). To adjust the zero position the wheel knob 1024 can be manually turned, which moves the adjustable line 1023. The movement of the adjustable line 1023 turns the adjustable wheel 1022. The turning of the adjustable wheel 1022 adjusts the angular position (and hence the zero position) of the wire 117.

Figure 8:
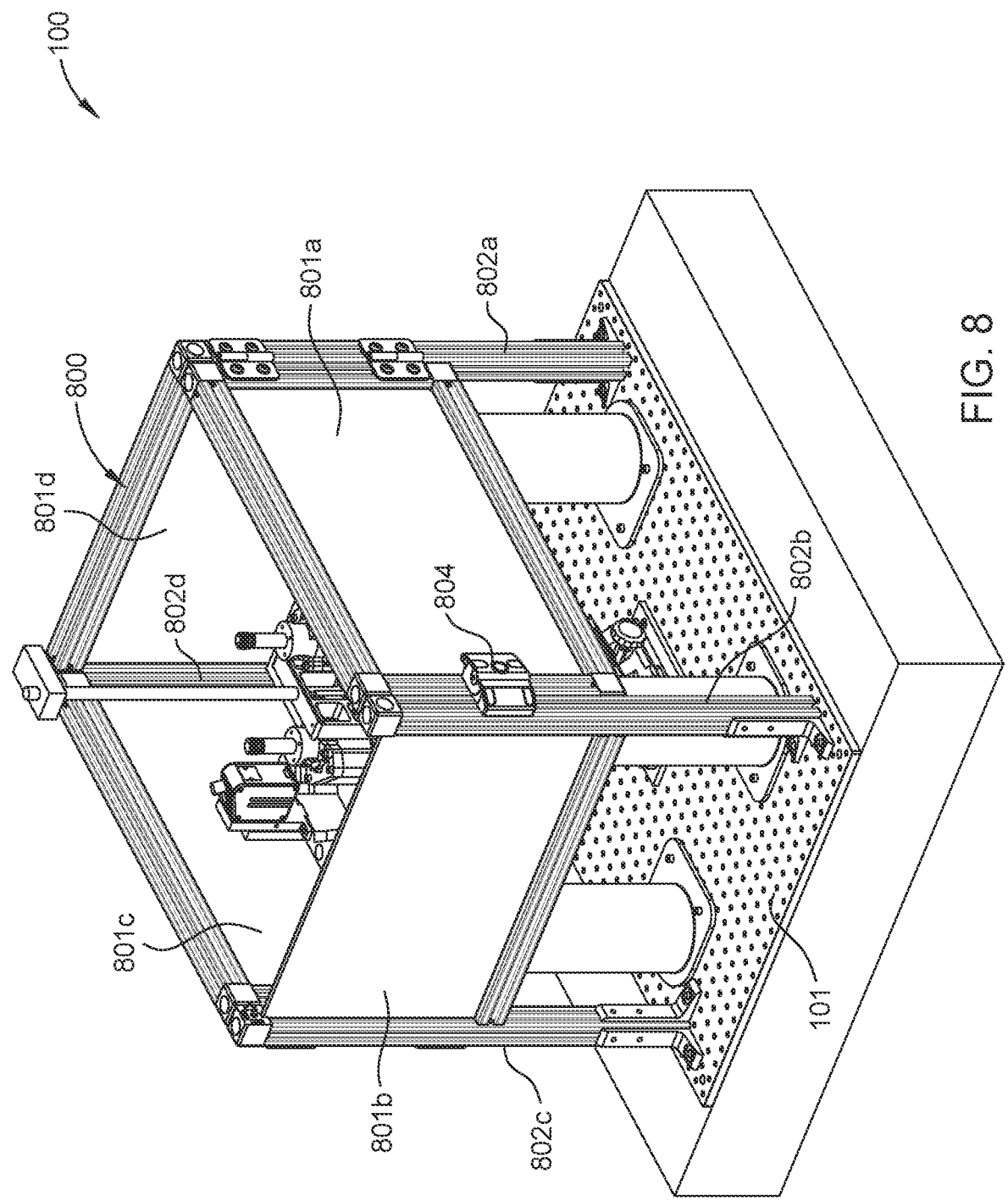
FIG. 8 is a schematic perspective front view of the testing apparatus and a barrier structure, according to one implementation.

FIG. 8 is a schematic perspective front view of the testing apparatus 100 and a barrier structure 800, according to one implementation. The barrier structure 800 is disposed to surround the central target arrangement 110 and the rotatable masses 131a, 131b. The barrier structure 800 is mounted to the base 101 using a plurality of legs 802a-802d. The barrier structure 800 includes a plurality of walls 801a-801d. At least one wall 801a is configured as a door that can pivot open and closed. A latch assembly 804 can be used to open and close the door wall 801a.

Figure 9:
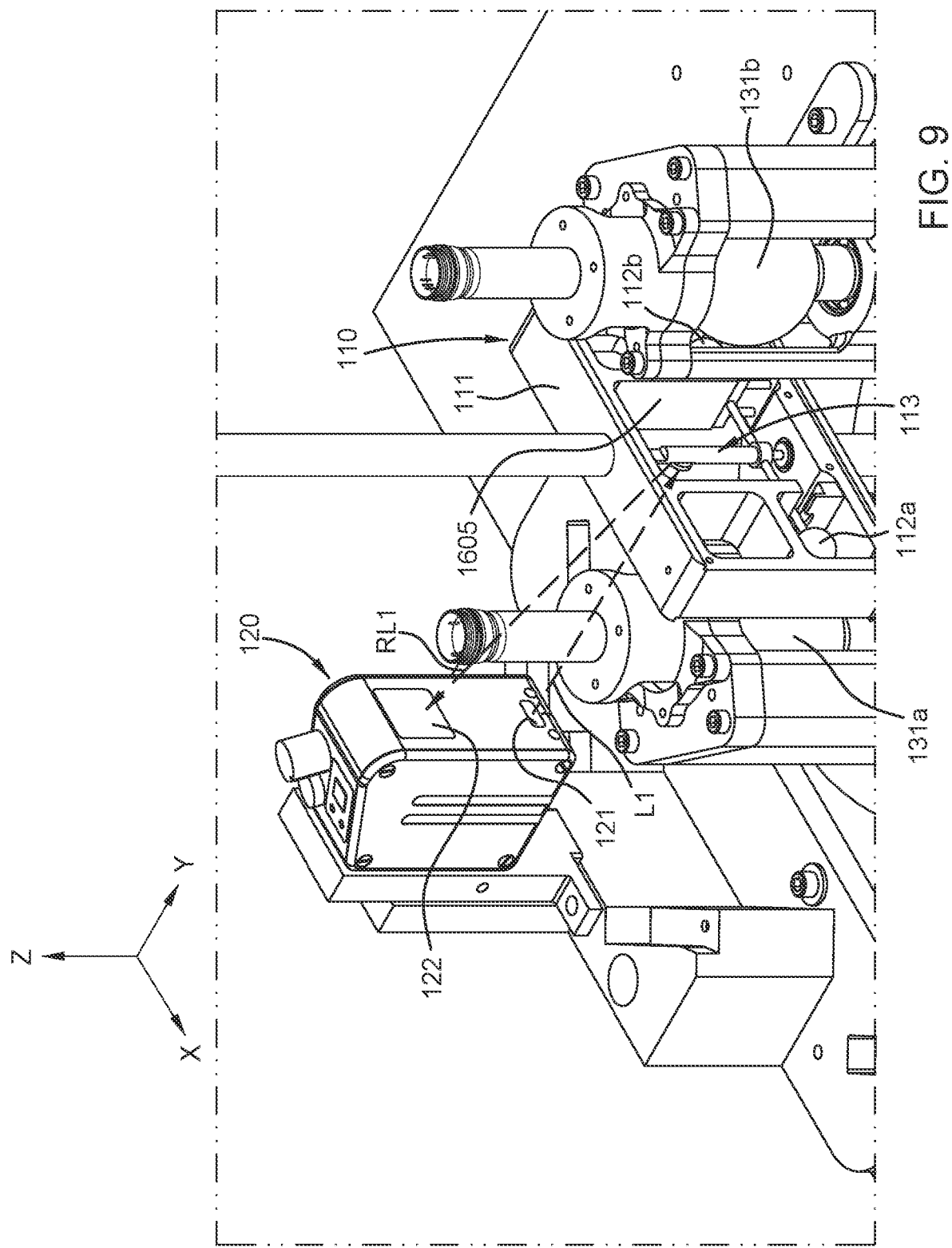
FIG. 9 is an enlarged view of a portion of the perspective front view shown in FIG. 1A, according to one implementation.
Figure 10:
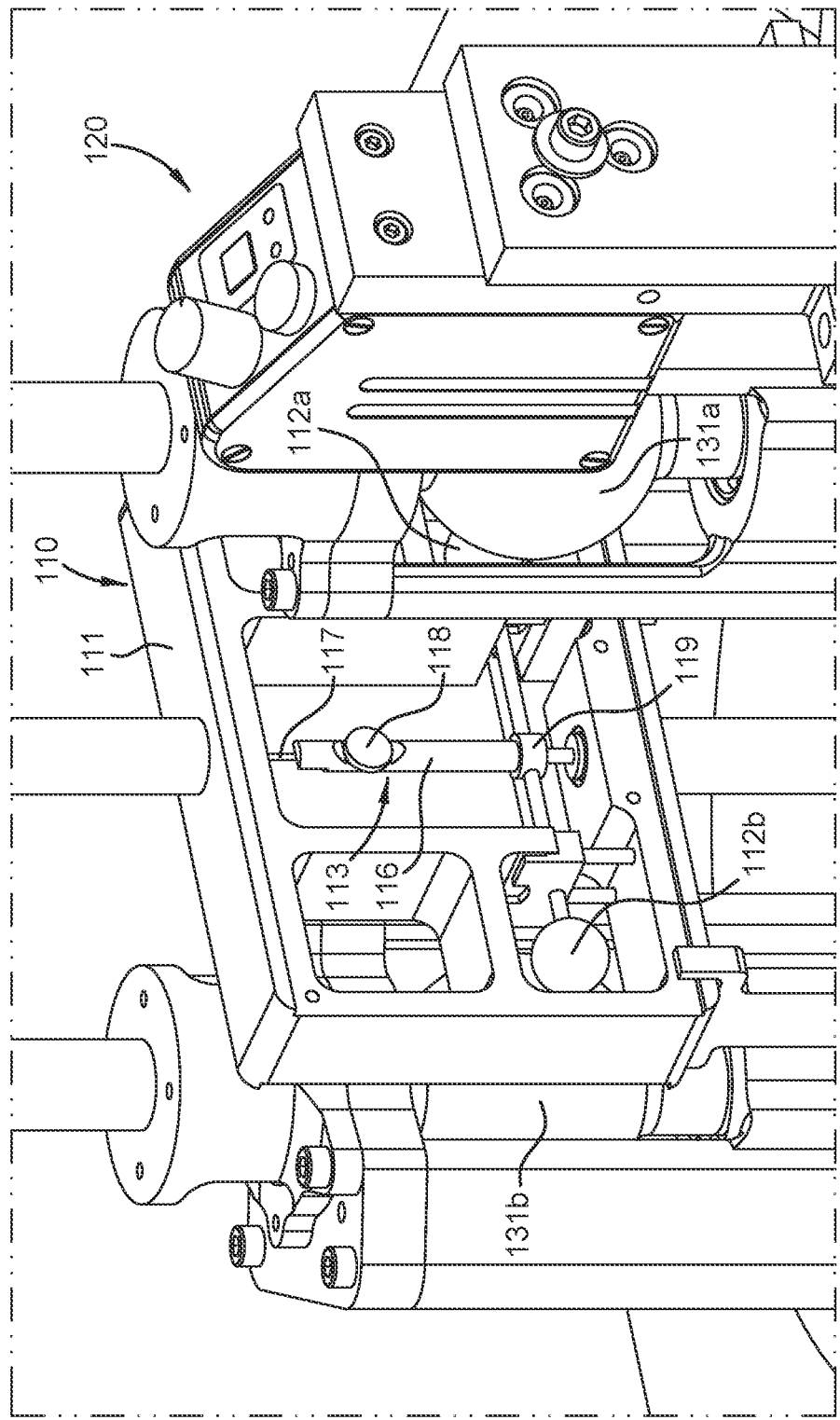
FIG. 10 is an enlarged view a portion of the perspective back view shown in FIG. 2, according to one implementation.

FIG. 9 is an enlarged view of the perspective front view shown in FIG. 1A, according to one implementation. FIG. 10 is an enlarged view of the perspective back view shown in FIG. 2, according to one implementation. The central target arrangement 110 includes a pair of masses 112a, 112b disposed within the target housing 111, and a target 113 disposed within the target housing 111. The detector 120 is configured to recognize the target 113. Each of the masses 112a, 112b has a mass that is smaller than each of the rotatable masses 131a, 131b.

As shown for example in FIG. 1A, the first rotatable mass 131a and the second rotatable mass 131b are both supported independently of the target housing 111 and the pair of masses 112a, 112b such that the rotatable masses 131a, 131b are independently movable relative to the target housing 111 and the masses 112a, 112b. The target 113 includes a pendulum 116 suspended from a wire 117 and an optical structure 118 mounted to the pendulum 116. In one embodiment, which can be combined with other embodiments, the optical structure 118 is a mirror configured to reflect light. In one embodiment, which can be combined with other embodiments, the detector 120 is an optical detector configured to emit light L1 toward the optical structure 118 using an emitter 121 and receive reflected light RL1 that is reflected from the optical structure 118 using a receiver 122. The pendulum 116 is coupled to the pair of masses 112a, 112b using a cross coupling 119 to move the pendulum 116 upon movement of the pair of masses 112a, 112b. In one embodiment, which can be combined with other embodiments, the wire 117 is formed of beryllium copper (BeCu) and has a known torsional spring constant.

During a measurement process, the rotatable masses 131a, 131b are rotated (e.g., spinning), which generates an attractive force between the rotatable masses 131a, 131b and the masses 112a, 112b. While the rotatable masses 131a, 131b rotate, the rotatable masses 131, 131b remain stationary in the X-Y plane and stationary along the Z-axis. The attractive force is in addition to gravitational force between the rotatable masses 131a, 131b and the masses 112a, 112b. The existence of the attractive force (which is due to a radial dilation effect from spinning of the rotatable masses 131a, 131b) causes the masses 112a, 112b to move along an arcuate path. The movement of the masses 112a, 112b moves (e.g., pivots) the optical structure 118 along an arcuate path. In one embodiment, which can be combined with other embodiments, the masses 112a, 112b and the optical structure 118 move at the same angular velocity.

A movement of the optical structure 118 will cause a change in the amount of reflected light RL1 that is collected and measured using the detector 120. The change in the amount of reflected light RL1 can be used to determine the amount of the attractive force generated due to the spinning of the rotatable masses 131a, 131b.

The present disclosure contemplates that the detector 120 can be used to conduct an initial calibration process prior to the measurement process. See, for example FIGS. 23 and 24, and the associated descriptions thereof, for an initial calibration operation that determines the positions of the target 111, the pair of masses 112a, 112b, and/or the rotatable masses 131a, 131b. The initial calibration process can be conducted at a plurality of positions of the detector 120 to determine an optimal position for the detector 120 during the measurement process. In one or more embodiments, the detector 120 can measure an amount of reflected light RL1 without the presence of the rotatable masses 131a, 131b.

Figure 11:
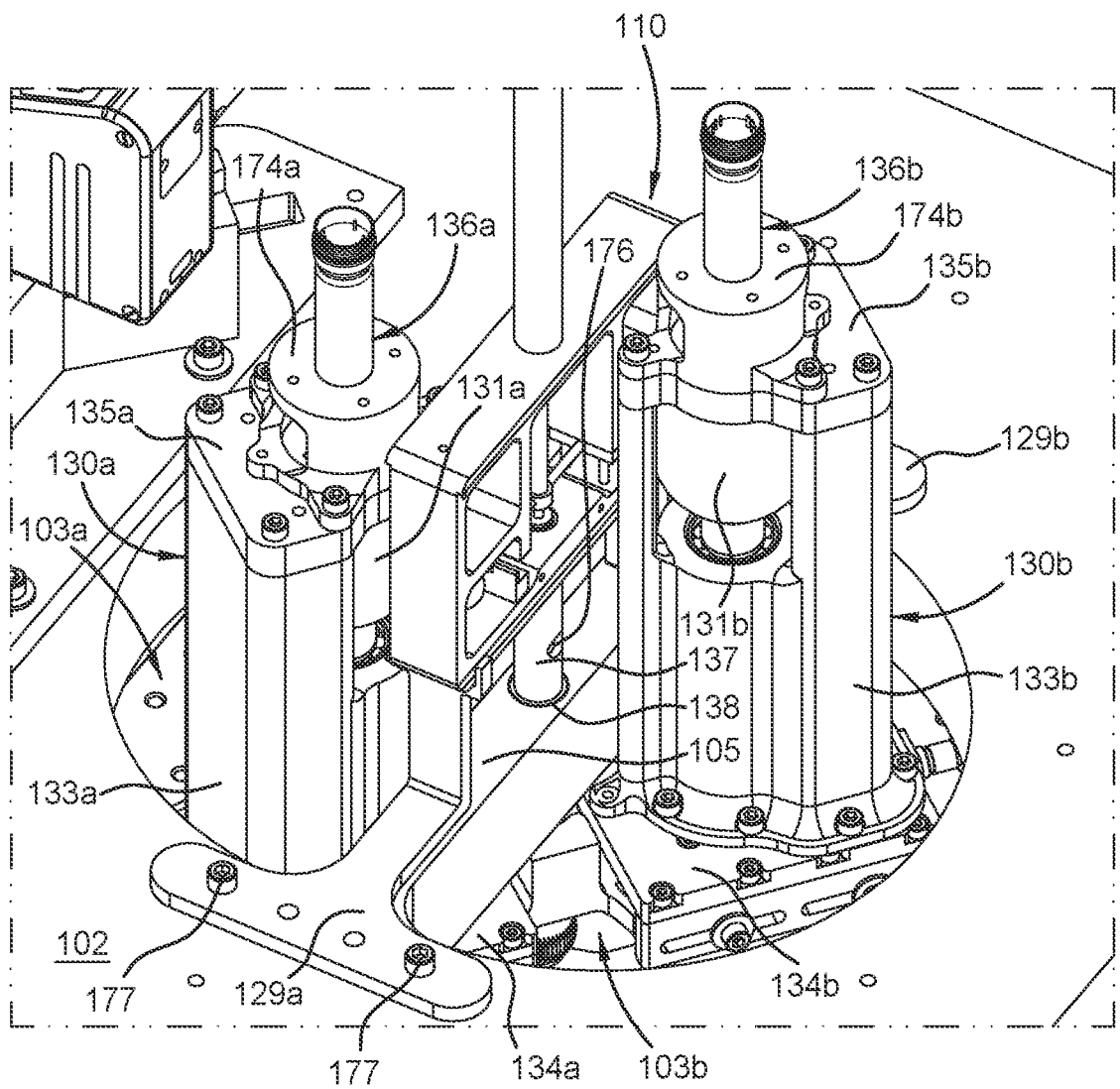
FIG. 11 is an enlarged view of a portion of the perspective front view shown in FIG. 1A, according to one implementation.

FIG. 11 is an enlarged view of the perspective front view shown in FIG. 1A, according to one implementation. Each of the first spinner tower 130a and the second spinner tower 130b respectively includes a tower housing 133a, 133b coupled to a tower base 134a, 134b. The respective first rotatable mass 131a or second rotatable mass 131b is received within the tower housing 133a or 133b. Each tower housing 133a, 133b includes an end plate 135a, 135b. Each of the first spinner tower 130a and the second spinner tower 130b respectively includes an electric motor 136a, 136b mounted to the tower housing 133a or 133b using a tower cap 174a, 174b. The electric motor 136a, 136b is configured to rotate the respective first rotatable mass 131a or second rotatable mass 131b relative to the tower housing 133a or 133b at a rotation speed. The rotation speed is greater than 1,000 rotations-per-minute. In one embodiment, which can be combined with other embodiments, the rotation speed is greater than 5,000 rotations-per-minute, such as 6,000 rotations-per-minute. In one embodiment, which can be combined with other embodiments, the rotation speed is up to 60,000 rotations-per-minute. Each rotatable mass 131a, 131b is rotatable bi-directionally such that each rotatable mass 131a, 131b can rotate in a clockwise direction and in a counter-clockwise direction.

The target housing 111 is mounted to the table 102 through one or more brackets 129a, 129b (two are shown in FIG. 11) coupled to the table 102 and a rod 137 extending into the beam 105. The one or more brackets 129a, 129b facilitate preventing movement (such as rotation) of the target hosing 111. Each of the one or more brackets 129a, 129b includes one or more adjustable fasteners 177 (such as set screws) that can adjust the position of the target housing 111 by turning the one or more adjustable fasteners 177. The rod 137 is received in a sleeve 138. The rod 137 is coupled to (such as integrally formed with) the target housing 111.

The rod 137 includes a sight 176. A tilted mirror is viewable in the sight 176. A user can view the tilted mirror in the sight 176 to determine if the tilted mirror, and hence the target 113, is horizontally level.

Figure 12:
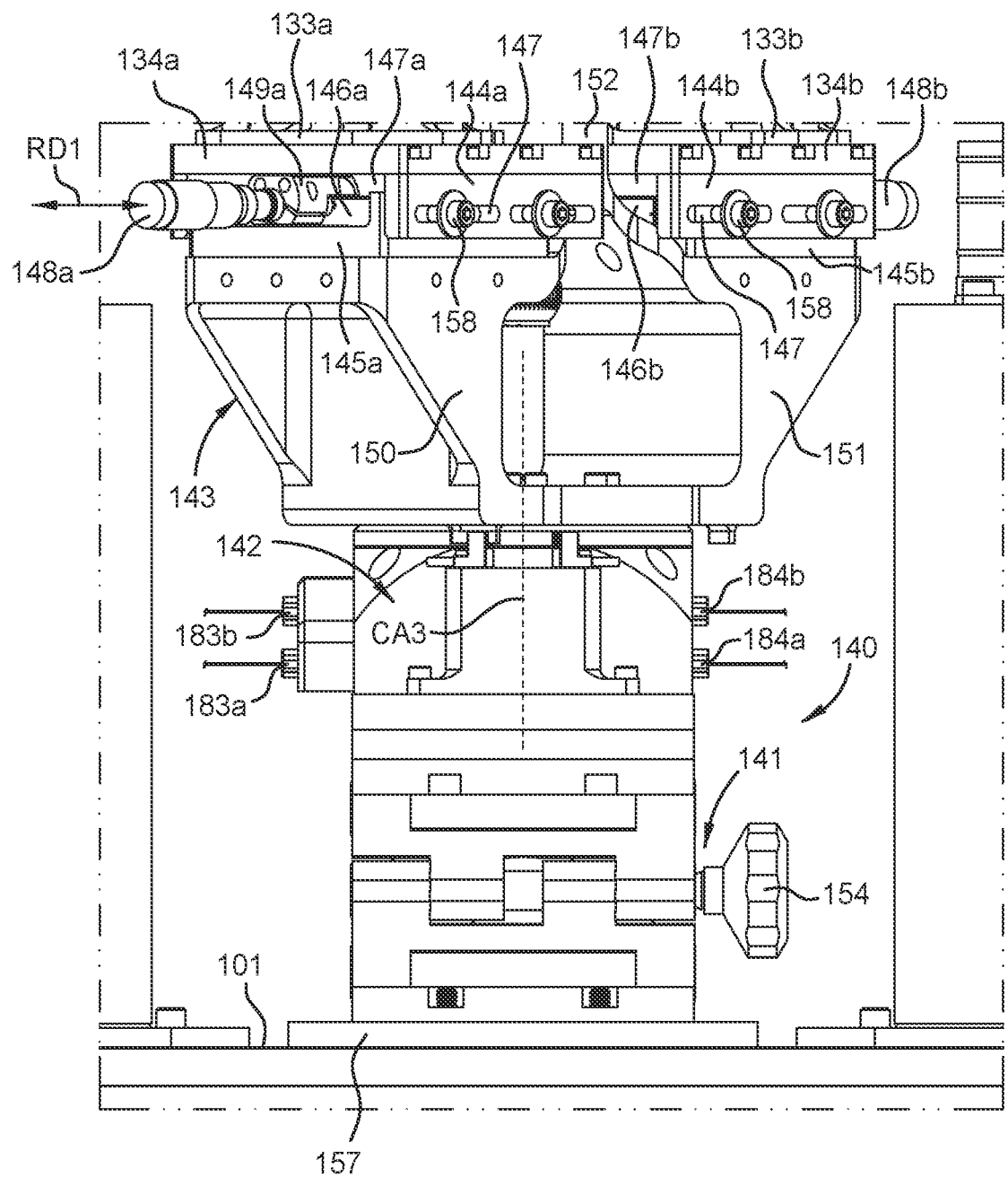
FIG. 12 is an enlarged view of a portion of the side view of the first side shown in FIG. 6, according to one implementation.

FIG. 12 is an enlarged view of the side view of the first side shown in FIG. 6, according to one implementation. The stage 140 includes a stage base 141 configured to raise and lower a stage block 142 along the Z-axis. The stage base 141 is mounted to the base 101 through a stage plate 157. The stage 140 includes a rotary pedestal 143 coupled to the stage block 142 and configured to rotate relative to the stage block 142. The stage block 142 includes one or more connections 183a, 183b communicatively coupled to one or more position sensors of the stage 140. The one or more position sensors are configured to measure an X-position along the X-axis, a Y-position along the Y-axis, and a Z-position along the Z-axis of each of the first rotatable mass 131a and the second rotatable mass 131b. One or more limit switches 184a, 184b are included for the stage 140 to limit the movement of the stage 140. The limit switches 184a, 184b limit movement of the stage 140 to prevent contact of the spinner towers 130a, 130b with the central target arrangement 110.

The rotary pedestal 143 is configured to rotate within the X-Y plane. The stage 140 includes a first movable tray 144a movably coupled to the rotary pedestal 143, and a second movable tray 144b movably coupled to the rotary pedestal 143. The first and second movable trays 144a, 144b are respectively coupled to the tower bases 134a, 134b of the first and second spinner towers 130a, 130b. Each movable tray 144a, 144b is movably coupled to the rotary pedestal 143 through a respective base plate 145a, 145b that is coupled to the rotary pedestal 143 and is stationary relative to the rotary pedestal 143.

Each movable tray 144a, 144b is coupled to the respective base plate 145a, 145b using a plurality of pins 158 that extend through slots 147 of the movable tray 144a, 144b and into the respective base plate 145a, 145b. Each tower base 134a, 134b is coupled to a movable block 146a, 146b, and each base plate 145a, 145b is coupled to a stationary block 147a, 147b that is stationary relative to the rotary pedestal 143. A first linear actuator 148a is threaded into a threaded portion 149a of the first stationary block 147a, and a second linear actuator 148b is threaded into a threaded portion 149b of the second stationary block 147b. The rotary pedestal 143 includes a first arm 150 coupled to the first base plate 145a, a second arm 151 coupled to the second base plate 145b, and a central section 152 extending between the first and second arms 150, 151.

The stage base 141 is a scissor-lift stage base. A rotatable actuator 154 is turned to bring closer together two joints 155a, 155b of two sets of scissor arms 156a, 156b (shown in FIG. 7) and thereby lower the stage block 142. The rotatable actuator 154 is turned in an opposite direction to space further apart the two joints 155a, 155b of the two sets of scissor arms 156a, 156b (shown in FIG. 7) and thereby raise the stage block 142.

Using measurement operations described herein, the stage 140 can be used to move the rotatable masses 131a, 131b such that the attractive force (resulting from a radial dilation effect) can be measured at a variety of positions of the rotatable masses 131a, 131b. The stage 140 is configured to move the rotatable masses 131a, 131b along the X-axis, along the Y-axis, and along the Z-axis. Using the stage base 141, the rotatable masses 131a, 131b can be moved up or down along the Z-axis. Using the rotary pedestal 132, the rotatable masses 131a, 131b can be moved along a circumferential direction CD1 (shown in FIG. 3) within the X-Y plane. Using the linear actuators 148a, 148b, the movable blocks 146a, 146b, the movable trays 144a, 144b, and the tower bases 134a, 134b, the rotatable masses 131a, 131b can be moved along a radial direction RD1 (also shown in FIG. 3) within the X-Y plane. In one embodiment, which can be combined with other embodiments, the position of each rotatable mass 131a, 131b is linearly adjustable by a range of up to 0.75 inch along the radial direction RD1. In one embodiment, which can be combined with other embodiments, the position of each rotatable mass 131a, 131b is angularly adjustable by a range of up to 104 degrees along the circumferential direction CD1.

The linear actuators 148a, 148b are turned in one direction to move the rotatable masses 131a, 131b closer together, and the linear actuators 148a, 148b are turned in an opposite direction to move the rotatable masses 131a, 131b further apart from each other. Each linear actuator 148a or 148b is turned to thread into or out of the threads of the respective threaded portion 149a or 149b. The threaded portions 149a, 149b are stationary relative to the rotary pedestal 143 such that turning of the linear actuators 148a, 148b translates the linear actuators 148a, 148b. The movable blocks 146a, 146b slide with the translation of the linear actuators 148a, 148b. The stage 140 is positioned such that a central axis CA3 (shown in FIG. 12) of the rotary pedestal 143 is aligned with the wire 117.

Figure 13:
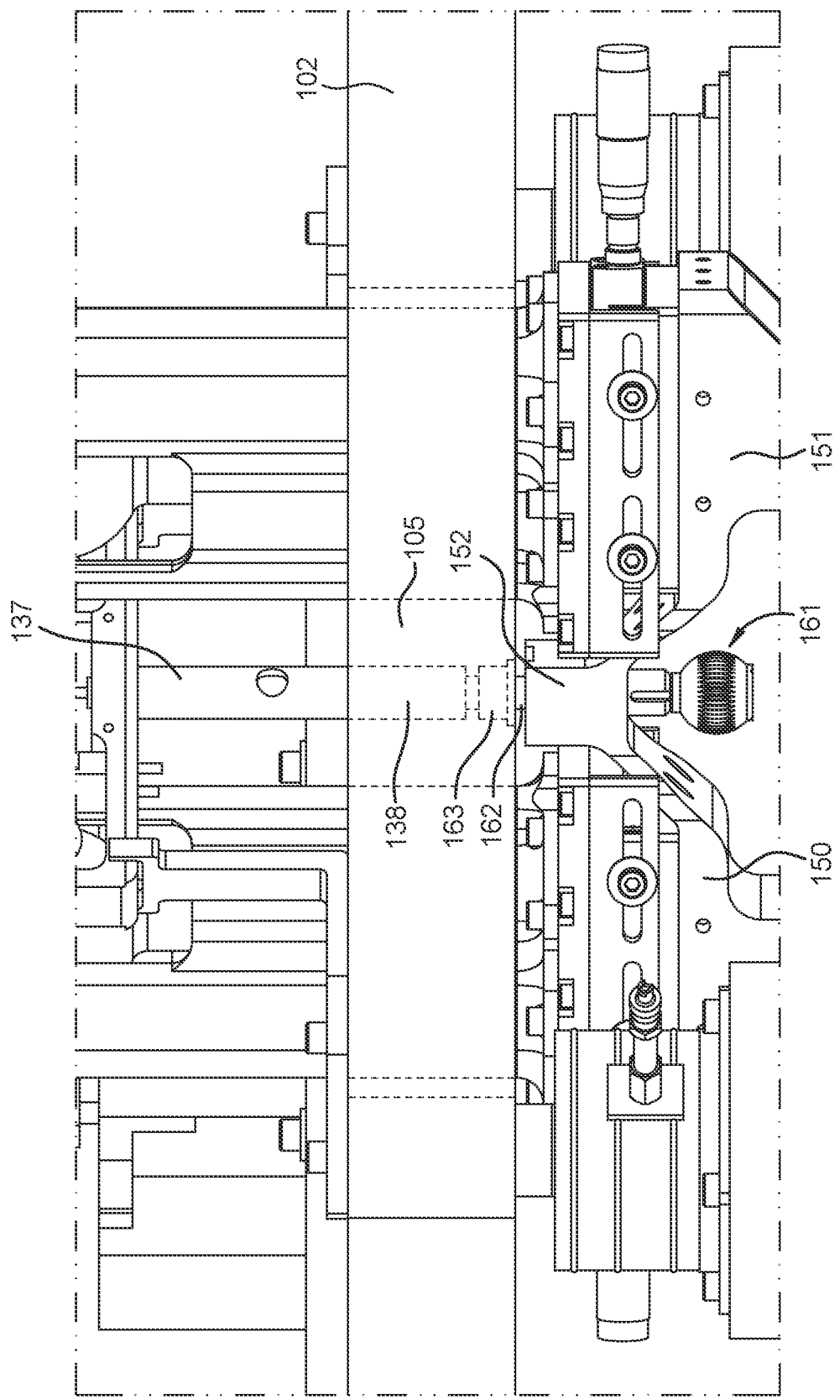
FIG. 13 is a schematic side view of the testing apparatus, according to one implementation.

FIG. 13 is a schematic side view of the testing apparatus 100, according to one implementation. The stage 140 includes a locator pin 161 extending through the central section 152 of the rotary pedestal 143. An end portion 162 of the locator pin 161 can be received in a receptacle 163 disposed in the beam 105 to align the central axis CA3 of the rotary pedestal 143 with the wire 117. The present disclosure contemplates that the end portion 162 can be removed from the receptacle 163 prior to conducting a measurement process. The locator pin 161 can be biased, such as spring loaded.

Figure 14:
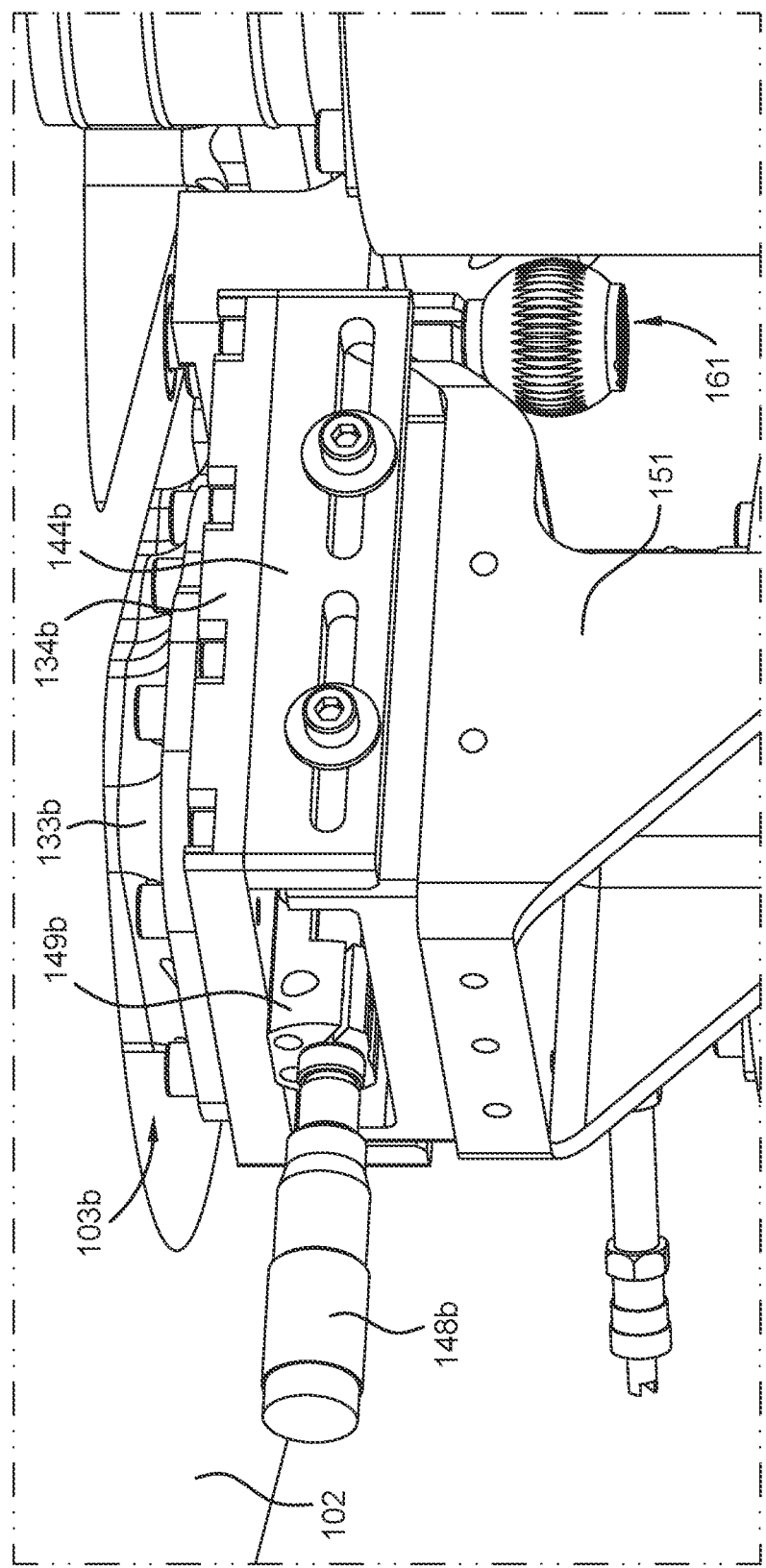
FIG. 14 is a schematic perspective view of a second arm of the rotary pedestal shown in FIG. 12, according to one implementation.
Figure 15A:
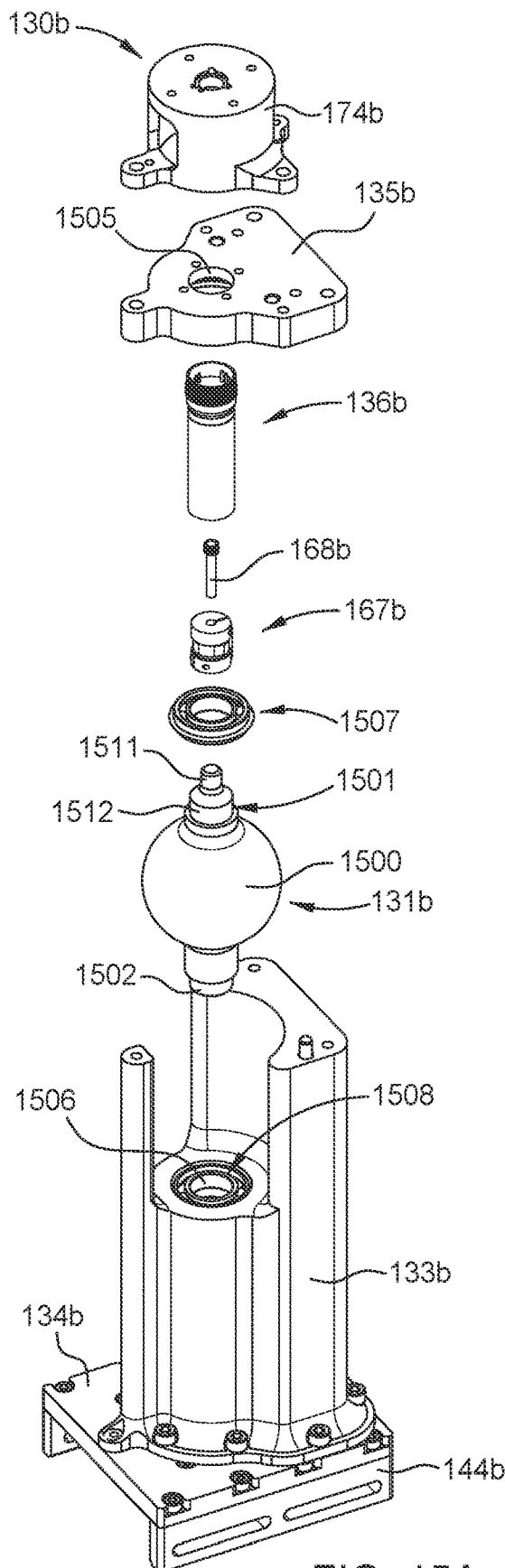
FIG. 15A is a schematic partially exploded perspective view of the second spinner tower shown in FIG. 11, according to one implementation.

FIG. 14 is a schematic perspective view of the second arm 151 of the rotary pedestal 143 shown in FIG. 12, according to one implementation. FIG. 15A is a schematic partially exploded perspective view of the second spinner tower 130b shown in FIG. 11, according to one implementation. The second rotatable mass 131b includes a middle portion 1500, a first extension 1501, and a second extension 1502. The first extension 1501 is received at least partially in an opening 1505 of the end plate 135b, and is drivable by the electric motor 136b. The second extension 1502 is received at least partially in an opening 1506 of the tower housing 133b. One or more first bearings 1507 are disposed about the first extension 1501 and are retained in a groove of the end plate 135b that is adjacent to the opening 1505. Each of the first extension 1501 and the second extensions 1502 is cylindrical in shape. Other shapes are contemplates for the first extension 1501 and the second extension 1502. One or more second bearings 1508 are disposed about the second extension 1502 and are retained in a groove of the tower housing 133b that is adjacent to the opening 1506.

As shown in FIG. 15A, the middle portion 1500 of the second rotatable mass 131b has a spherical shape such that an outer surface of the middle portion 1500 is spherical. In one embodiment, which can be combined with other embodiments, the middle portion 1500 has a cylindrical shape such that the outer surface of the middle portion 1500 is cylindrical. The present disclosure contemplates that other shapes may be used for the middle portion 1500, such as an oblong shape or a rectangular shape (for example a square shape).

The rotatable mass 131b is formed of a non-magnetic material to facilitate accurate measurements. In one embodiment, which can be combined with other embodiments, the non-magnetic material includes tungsten (W). In one embodiment, which can be combined with other embodiments, the non-magnetic material includes stainless steel. The present disclosure contemplates that other materials could be used for the non-magnetic material.

The spinner towers 130a, 130b are modular and interchangeable. By removing fasteners that couple the tower housings 133a, 133b to the tower bases 134a, 134b, the spinner towers 130a, 130b can be removed from the stage 140 and be repaired or replaced. Individual components of the spinner towers 130a, 130b are modular and interchangeable. For example, the rotatable masses 131a, 131b can be replaced with rotatable masses having a different shape or size.

Each electric motor 136a, 136b includes a coupler assembly 167a, 167b coupled to a motor shaft 168a, 168b. The coupler assembly 167a, 167b couples the motor shaft 168a, 168b to a first portion 1511 of the first extension 1501 of the respective rotatable mass 131a, 131b. The one or more first bearings 1507 are press-fit to a second portion 1512 of the first extension 1501 of the respective rotatable mass 131a, 131b. The one or more second bearings 1508 are press-fit to a portion (such as an end portion) of the second extension 1502. The present disclosure contemplates that the coupler assemblies 167a, 167b can be de-coupled from the motor shafts 168a, 168b and/or the first portion 1511 such that the motor shafts 168a, 168b rotate in place (without rotating the rotatable masses 131a, 131b). While the motor shafts 168a, 168b rotate in place, spin data regarding positioning of the target 118 can be collected, and such spin data can be used to determine a force difference of attractive force and/or can be considered along with spin data collected while the rotatable masses 131a, 131b rotate to determine a force difference.

The present disclosure contemplates that the first rotatable mass 131a can include one or more of the same aspects, features, components, and/or properties as the second rotatable mass 131b. The present disclosure contemplates that one of the rotatable masses 131a or 131b can be omitted for measurement processes. The present disclosure contemplates that more than two rotatable masses may be used, such as a total of four rotatable masses with two rotatable masses on each side 114, 115 of the target housing 111.

Figure 15B:
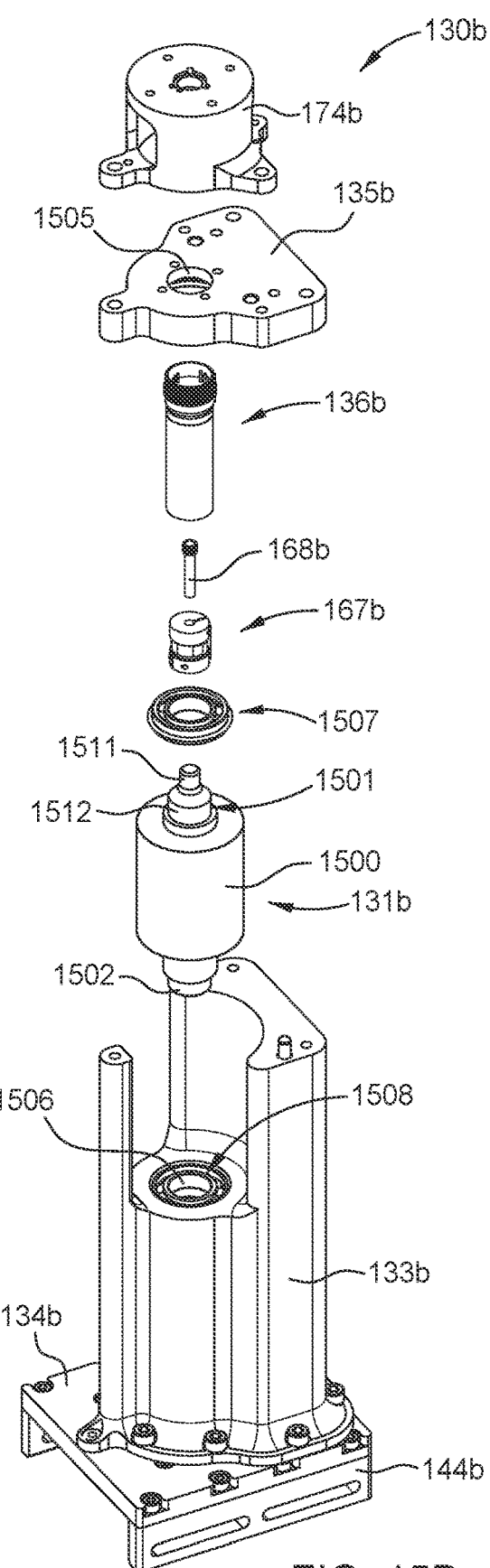
FIG. 15B is a schematic partially exploded perspective view of the second spinner tower shown in FIG. 15A, according to one implementation.

FIG. 15B is a schematic perspective view of the second spinner tower 130b shown in FIG. 15A, according to one implementation. In the implementation shown in FIG. 15B, the middle portion 1500 has a cylindrical shape such that the outer surface of the middle portion 1500 is cylindrical.

Figure 16:
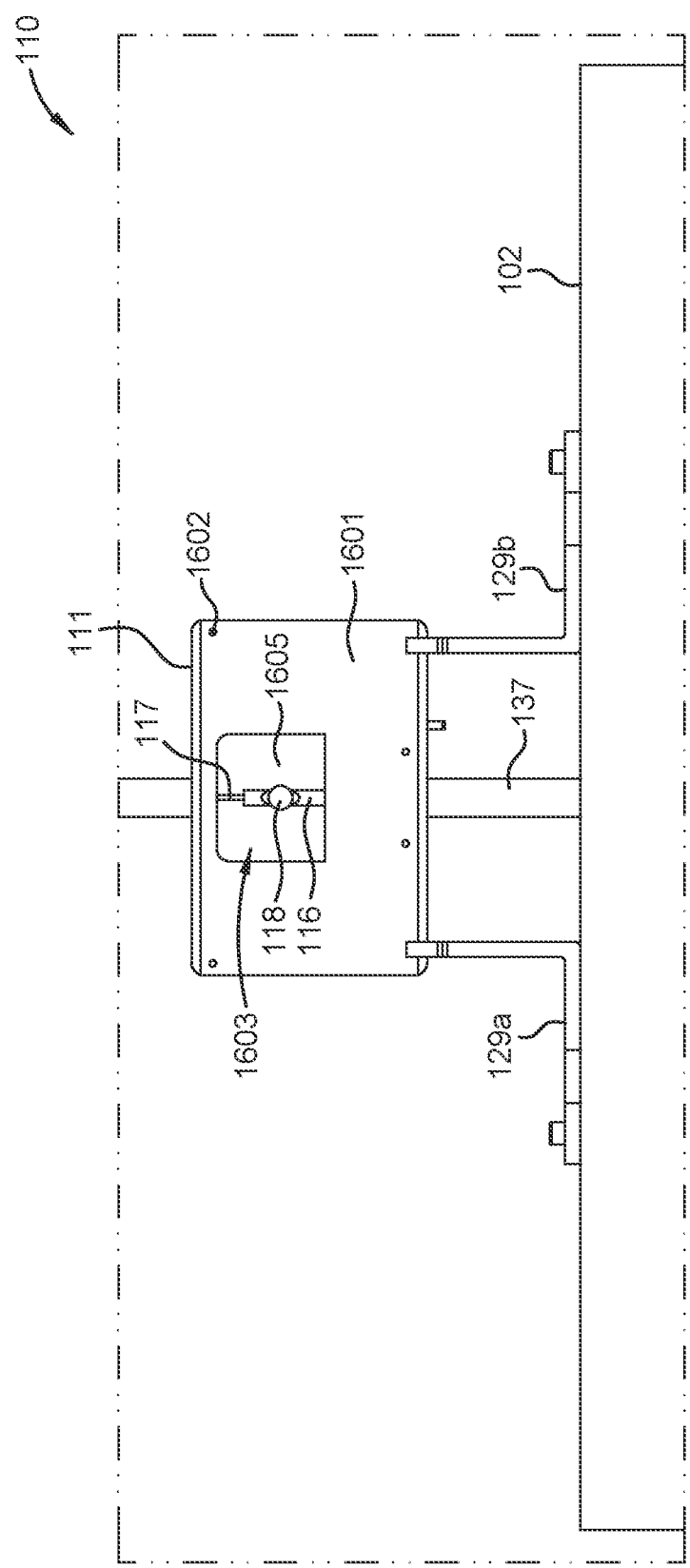
FIG. 16 is a schematic side view of a target housing shown in FIG. 1A, according to one implementation.

FIG. 16 is a schematic side view of the target housing 111 shown in FIG. 1, according to one implementation. A cover 1601 is removably coupled to each side 114, 115 of the target housing 111 using a plurality of fasteners 1602. Each cover 1601 includes a transparent window 1603 that allows the light L1 and the reflected light RL1 (shown in FIG. 9) to pass therethrough. In one embodiment, which can be combined with other embodiments, an internal volume 1605 of the target housing 111 is maintained under vacuum during the measurement process. The target 113 is positioned within the internal volume 1605.

Figure 17A:
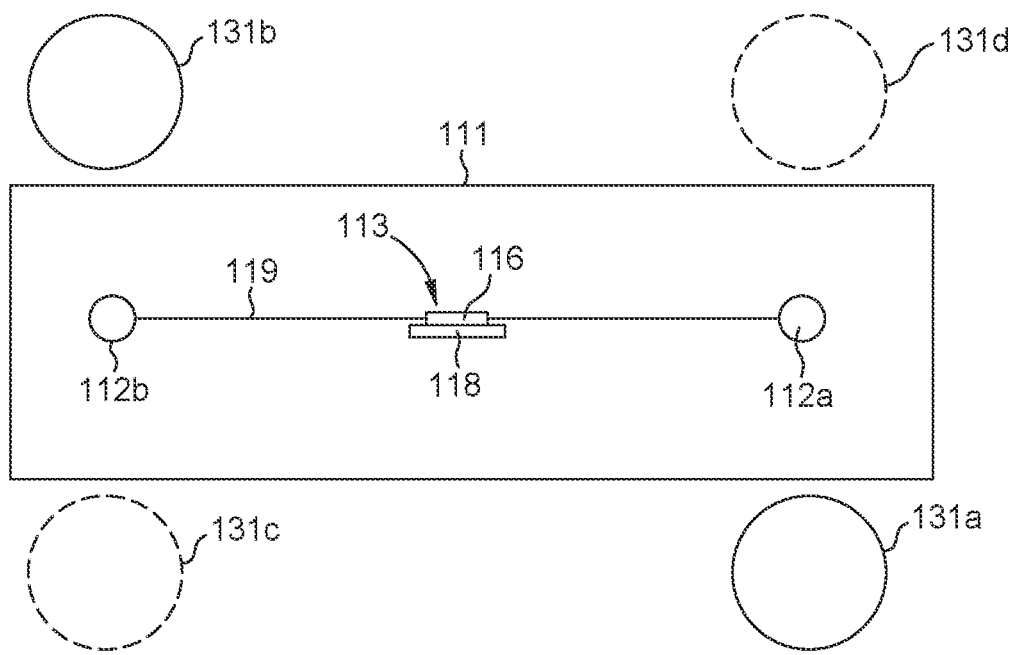
FIGS. 17A and 17B shows a difference in position of a target between a stationary state (shown in FIG. 17A) and a spinning state (shown in FIG. 17B) for rotatable masses.
Figure 17B:
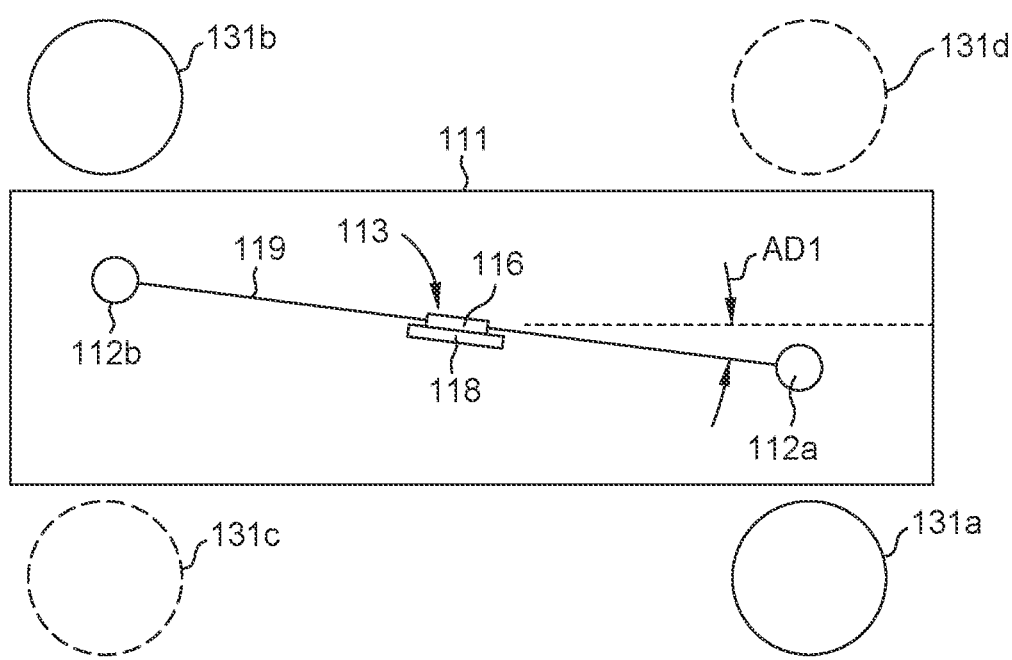

FIGS. 17A and 17B shows a difference in position of the target 113 between a stationary state (shown in FIG. 17A) and a spinning state (shown in FIG. 17B) for the rotatable masses 131a, 131b. In FIG. 17A, the rotatable masses 131a, 131b are stationary and not spinning. In FIG. 17B, the rotatable masses 131a, 131b are spinning at the rotation speed. The target 113 has pivoted by an angular distance AD1 as a result of the spinning rotatable masses 131a, 131b. The angular distance AD1 can be correlated to known data to determine a force difference that corresponds to the angular distance AD1.

In one or more embodiments, the known data includes one or more of: a mass value of the mass 112a, a mass value of the mass 112b, a mass value of the rotatable mass 131a, a mass value of the rotatable mass 131b, a mass value of the spinner tower 130a, a mass value of the spinner tower 130b, a spring constant of the wire 117, and/or a plurality of respective distances between the components (such as a distance between the mass 112a and the rotatable mass 131a and a distance between the mass 112b and the rotatable mass 131b). Using the known data, a theoretical attractive force can be calculated using a gravity equation, and the force difference can be determined by determining a difference between a measured force (measured during spinning of the rotatable masses 131a, 131b) and the theoretical attractive force. The gravity equation can include, for example, Newton's Law of Universal Gravitation.

In one embodiment, which can be combined with other embodiments, the angular distance AD1 is multiplied by a known spring constant of the wire 117 to determine the force difference. The angular distance AD1 can be measured by detecting the optical structure 118. As an example, the detector 120 can detect a change in the amount of reflected light RL1 that is reflected from the optical structure 118.

The present disclosure contemplates that two rotatable masses can be used on both sides of the target housing 111, as illustrated by the two additional rotatable masses 131c, 131d shown in ghost in FIGS. 17A and 17B.

Figure 18:
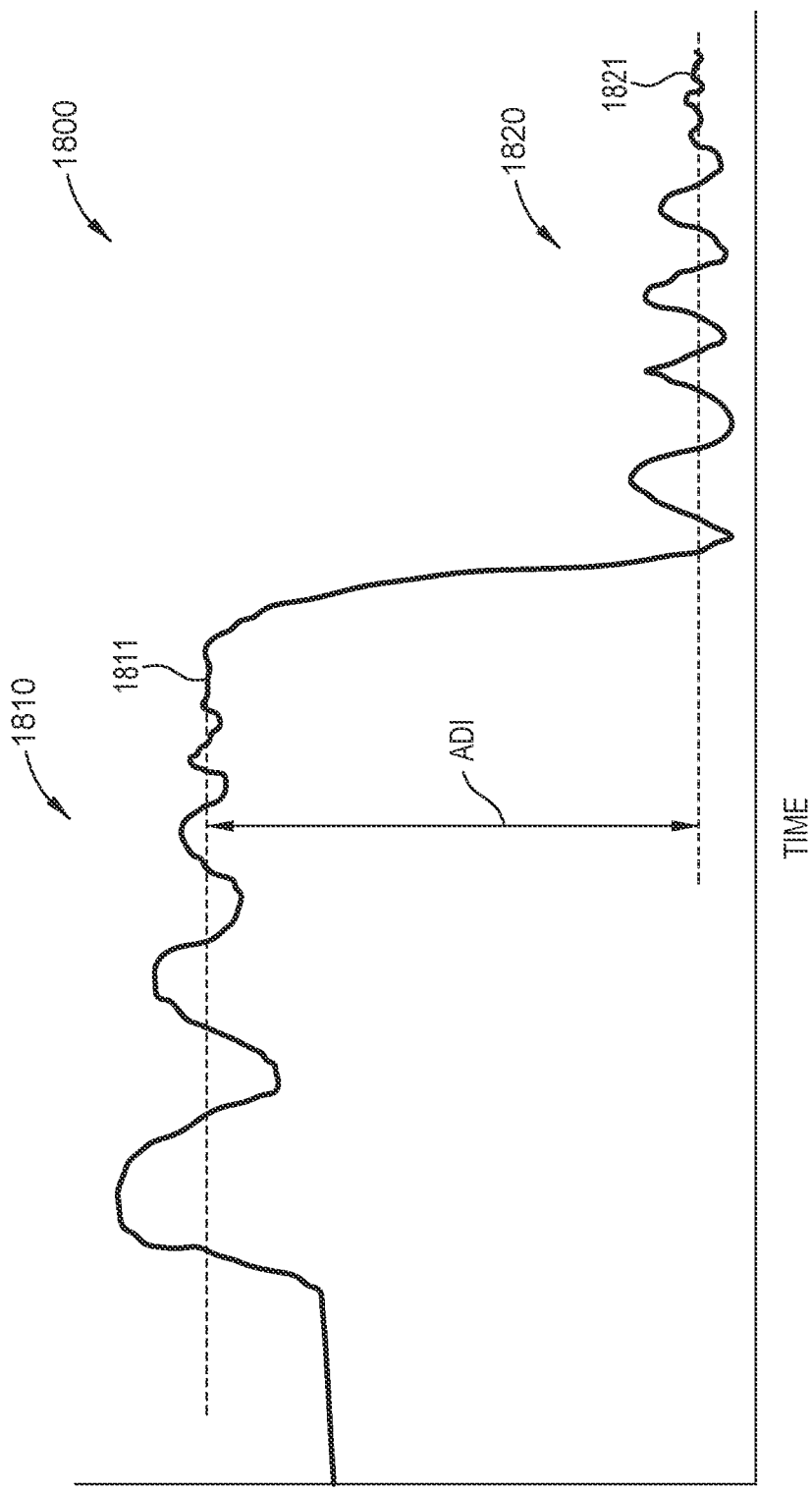
FIG. 18 is a schematic graphical view of a graph showing angular position versus time for a target during a measurement process, according to one implementation.

FIG. 18 is a schematic graphical view of a graph 1800 showing angular position versus time for the target 113 during a measurement process, according to one implementation. During a first section 1810 of the profile, the rotatable masses 131a, 131b are stationary (e.g., not spinning). During a second section 1820 of the profile, the rotatable masses 131, 131b are spinning at the rotation speed. A first settlement portion 1811 of the first section 1810 is compared to a second settlement portion 1821 of the second section 1820 to determine an angular distance ADI between the first settlement portion 1811 and the second settlement portion 1821.

Figure 19:
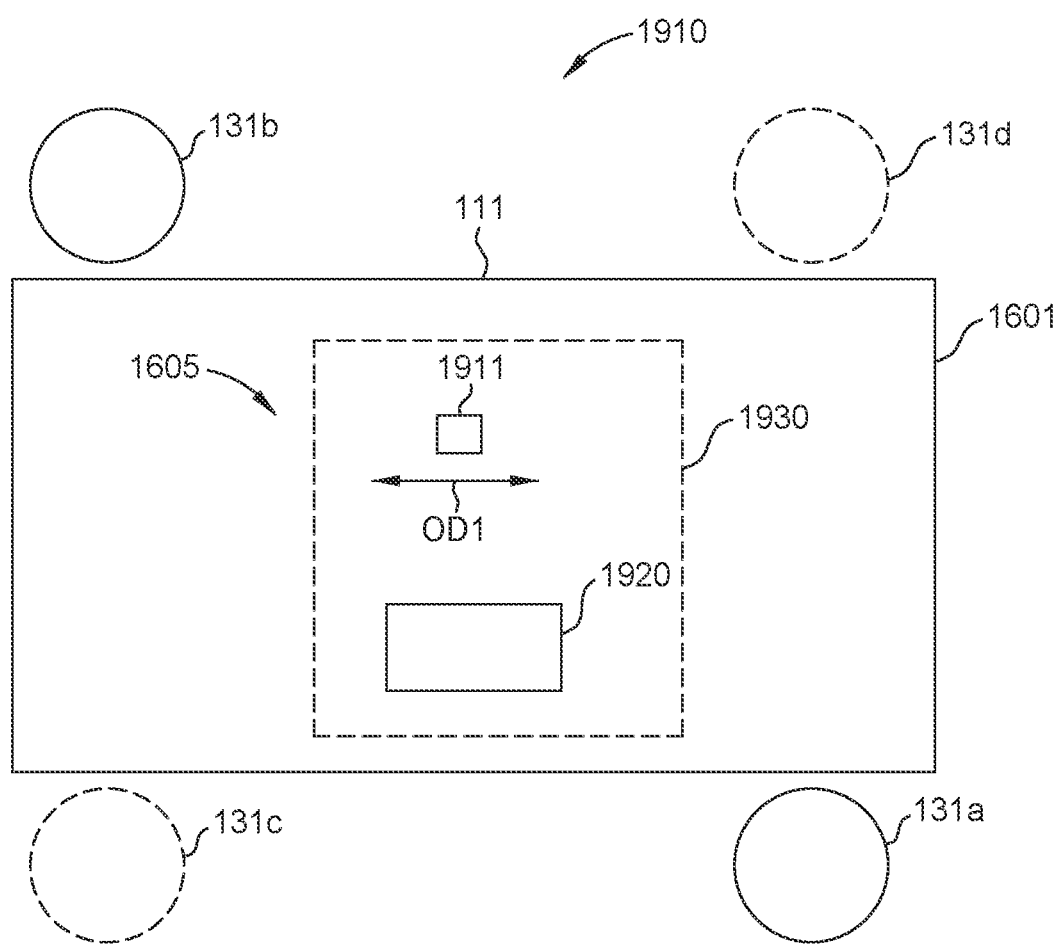
FIG. 19 is a schematic top view of a central target arrangement, according to one implementation.

FIG. 19 is a schematic top view of a central target arrangement 1910, according to one implementation. The central target arrangement 1910 can be used at least partially in place of the central target arrangement 110 shown in FIGS. 1 and 16. A cover 1930 is removably coupled to each side 114, 115 of the target housing 111 using a plurality of fasteners. In one embodiment, which can be combined with other embodiments, each cover 1930 is windowless. In the implementation shown in FIG. 19, the target includes a target atom 1911 that is configured to oscillate along an oscillation direction OD1. In the implementation shown in FIG. 19, the detector 120 is omitted, and a detector 1920 is included that is configured to detect an oscillation frequency of the target atom 1911. The detector 1920 is positioned within the target housing 111.

The target atom 1911 is formed of caesium (Cs). The present disclosure contemplates other materials for the target atom 1911. In one embodiment, which can be combined with other embodiments, the target atom 1911 and the detector 1920 are part of a chip-scale atomic clock (CSAC).

A stationary oscillation frequency of the target atom 1911 is measured while the one or more rotatable masses 131a, 131b are stationary (e.g., not spinning). A spinning oscillation frequency of the target atom 1911 is measured while the one or more rotatable masses 131a, 131b are spinning. The spinning oscillation frequency correlates to a spinning target motion of the target atom 1911. The stationary oscillation frequency correlates to a stationary target motion of the target atom 1911. A frequency difference between the stationary oscillation frequency and the spinning oscillation frequency is correlated to known data to determine a force difference that corresponds to a time dilation effect. In the context of a CSAC embodiment, a time dilation effect is determined.

In one or more embodiments, the known data includes oscillation frequency measurements taken using other CSAC's (such as other CSAC's located in the same lab as the detector 1920). In one or more embodiments, one or more of the stationary oscillation frequency and/or the spinning oscillation frequency is compared with other CSAC devices (e.g., oscillators) located in the same lab and other (e.g., external, such as in the same lab) stable time reference sources to determine the amount of time dilation effect observed by the detector 1920 over time. In one or more embodiments, time dilation effect observed by the detector 1920 is correlated to gravitational influence due to special relativity in order to determine the force difference. The determination can account for the effects that the closer the target atom 1911 is to the rotatable masses 131a, 131b, the slower time passes for the target atom 1911 and the detector 1920; and the farther the target atom 1911 is from the rotatable masses 131a, 131b, the faster time passes for the target atom 1911 and the detector 1920.

Figure 20:
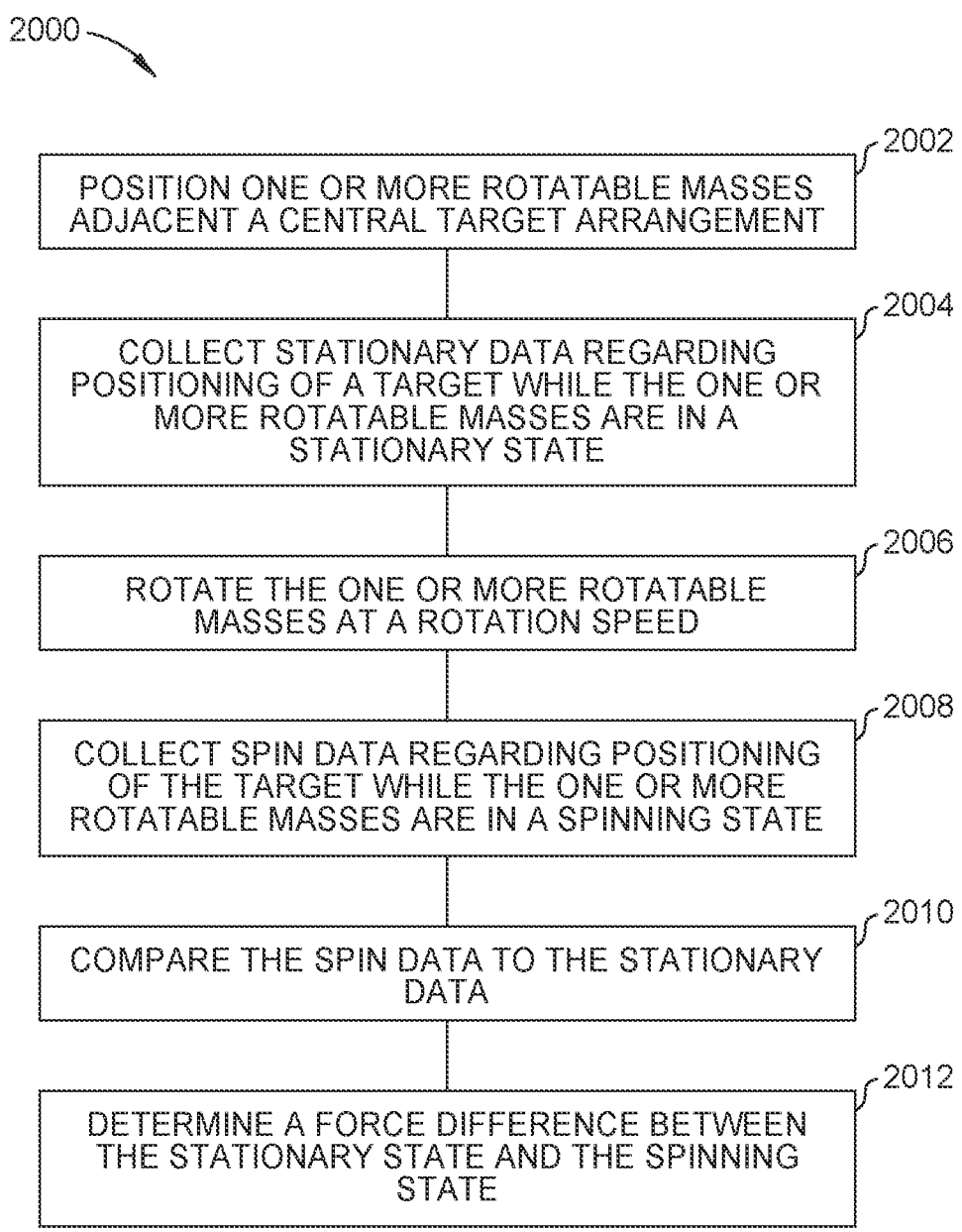
FIG. 20 is a schematic block diagram view of a method of detecting a radial dilation effect, according to one implementation.

FIG. 20 is a schematic block diagram view of a method 2000 of detecting a radial dilation effect, according to one implementation. Operation 2002 includes positioning one or more rotatable masses in a first position adjacent a central target arrangement. The one or more rotatable masses are positioned outside of a target housing of the central target arrangement.

Operation 2004 includes collecting stationary data regarding positioning of a target disposed within the target housing while the one or more rotatable masses are in a stationary state. Operation 2006 includes rotating the one or more rotatable mases at a rotation speed. Operation 2008 includes collecting spin data regarding positioning of the target while the one or more rotatable masses are in a spinning state.

Operation 2010 includes comparing the spin data to the stationary data. Operation 2012 includes determining a force difference between the stationary state and the spinning state. The force difference approximates or is equal to a radial dilation effect (e.g., an attractive force in addition to gravitational forces) resulting from the rotation of the one or more rotatable masses at the rotation speed. In one or more embodiments, the determination of the force difference includes compensating for one or more external gravitational effects. The one or more external gravitational effects (such as tidal effects) can involve gravitational forces of any object external to the one or more rotatable masses (such as gravitational forces—which can vary due to changing positions—of the moon, the sun, and/or any other orbital object).

In one embodiment, which can be combined with other embodiments, the collection of stationary data (of operation 2004) and the collection of spin data (of operation 2008) each includes emitting light toward the target, and receiving reflected light that is reflected from the target. In such an embodiment, the determination of the force difference (of operation 2012) includes correlating a stationary light amount to a stationary target position, correlating a spinning light amount to a spinning target position, and multiplying a target deflection by a spring constant. The target deflection is a difference between the stationary target position and the spinning target position. Each of the stationary light amount and the spinning light amount is a steady-state value.

In one embodiment, which can be combined with other embodiments, the collection of stationary data and the collection of spin data each includes oscillating a target atom. In such an embodiment, the determination of the force difference includes correlating a stationary oscillation frequency to a stationary target motion, correlating a spinning oscillation frequency to a spinning target motion, and correlating a frequency difference to a known force difference. The frequency difference is a difference between the stationary oscillation frequency and the spinning oscillation frequency.

Referring to various implementations of the present disclosure, measurement equipment 195 and control equipment 196 is communicatively coupled to various components of the testing apparatus 100 as shown in at least FIG. 1A. In the implementation shown in FIGS. 1 and 12, the measurement equipment 195 and the control equipment 196 are communicatively coupled to the detector 120, the electric motors 136a, 136b, the stage 140 (such as the stage base 141, the stage block 142, and/or the rotary pedestal 143), the one or more position detectors of the stage 140, and/or the one or more fluid sources 186.

The components of the testing apparatus 100 can be controlled all automatically, all manually, or partially automatically and partially manually. The operations described herein (such as the operations of the method 2000) can be conducted all automatically, all manually, or partially automatically and partially manually. In one embodiment, which can be combined with other embodiments, the testing apparatus 100 includes a controller 190 (shown in FIG. 1A) that is configured to at least partially automatically control the testing apparatus 100 and/or at least partially automatically conduct one or more operations described herein.

The controller 190 is communicatively coupled to the measurement equipment 195 and the control equipment 196. In one embodiment, which can be combined with other embodiments, the controller 190 is configured to automatically conduct one or more operations of the method 2000. The controller 190 includes a central processing unit (CPU) 191, a memory 192 containing instructions, and support circuits 193 for the CPU 191. The controller 190 controls the components of the testing apparatus 100 directly, or via other computers and/or controllers. In one or more embodiments, the components of the testing apparatus 100 each include a dedicated controller in communication with the controller 190, and the controller 190 functions as a central controller.

The controller 190 is of any form of a general-purpose computer processor that is used in an industrial setting for controlling various measurement equipment, and sub-processors thereon or therein. The memory 192, or non-transitory computer readable medium, is one or more of a readily available memory such as random access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)), read only memory (ROM), floppy disk, hard disk, flash drive, or any other form of digital storage, local or remote. The support circuits 193 are coupled to the CPU 191 for supporting the CPU 191 (a processor). The support circuits 193 include cache, power supplies, clock circuits, input/output circuitry and subsystems, and the like. Operational parameters and operations are stored in the memory 192 as a software routine that is executed or invoked to turn the controller 190 into a specific purpose controller to control the operations of the testing apparatus 100. The controller 190 is configured to conduct any of the operations of the methods described herein. The instructions stored on the memory 192, when executed, cause one or more of operations 2002-2012 of method 2000 to be conducted.

The various operations described herein (such as the operations 2002-2012 of the method 2000) can be conducted automatically using the controller 190, or can be conducted automatically or manually with certain operations conducted by a user. The present disclosure contemplates that the controller 190 can be integrated with one or more components of the testing apparatus 100, the measurement equipment 195, and/or the control equipment 196.

Figure 21:
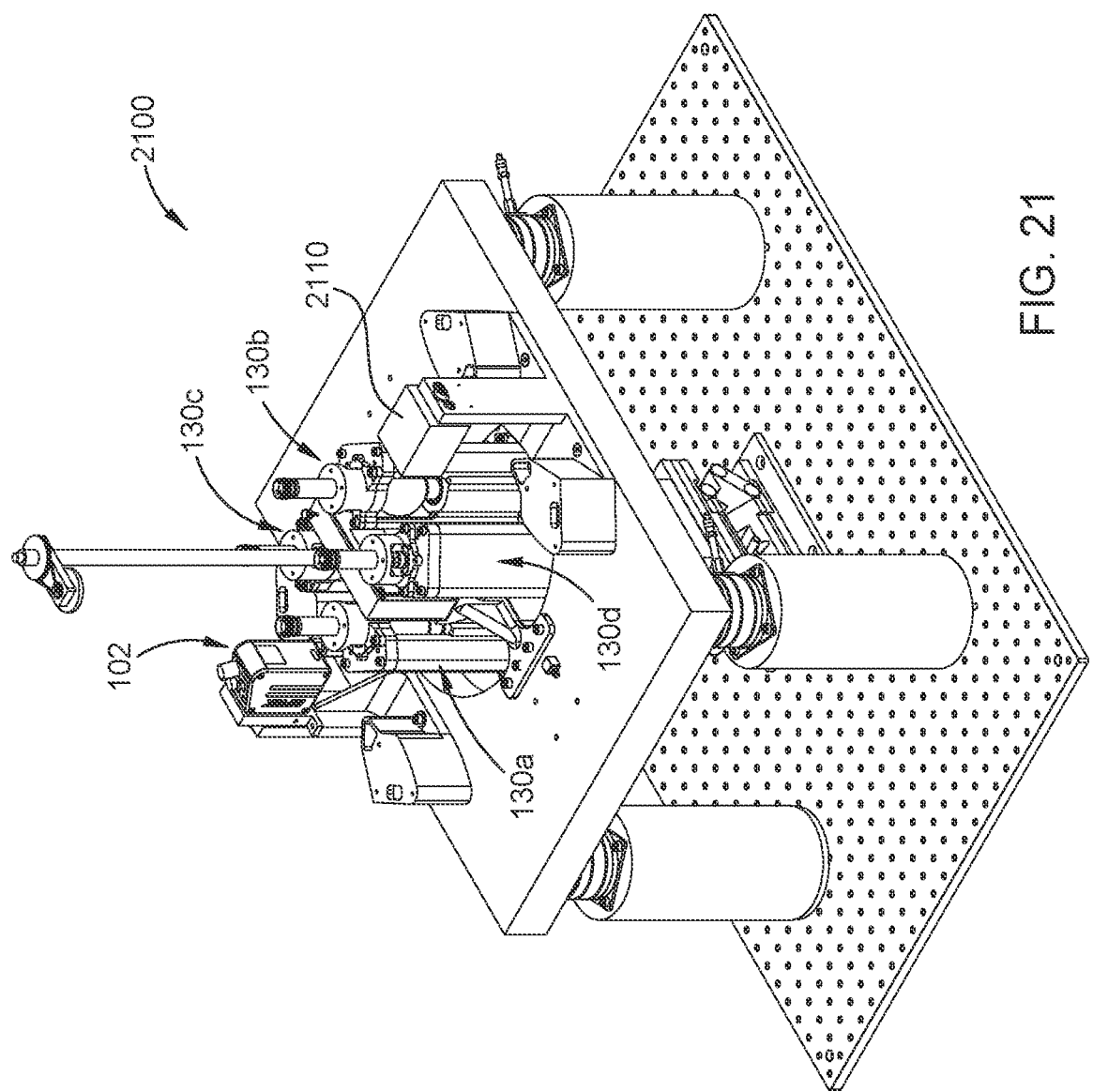
FIG. 21 is a schematic perspective front view of a testing apparatus, according to one implementation.

FIG. 21 is a schematic perspective front view of a testing apparatus 2100, according to one implementation. The testing apparatus 2100 is similar to the testing apparatus 100 shown in FIG. 1A, and includes one or more of the aspects, features, components, operations, and/or properties thereof. The testing apparatus 2100 includes a third spinner tower 130c and a fourth spinner tower 130d. Force difference measurements can be taken while the rotatable masses 131a-131d of all four spinner towers 130a-130d spin. A first set of force difference measurements can be taken while the first and second rotatable masses 131a, 131b spin and the third and fourth rotatable masses 131c, 131d are stationary, and a second set of force difference measurements can be taken while the third and fourth rotatable masses 131c, 131d spin and the first and second rotatable masses 131a, 131b are stationary. The testing apparatus 2100 includes a balancing mass 2110 positioned opposite of the detector 102. The balancing mass 2110 facilitates balancing attractive forces between the pair of masses 112a, 112b and the rotatable masses 131a-131d.

Figure 22:
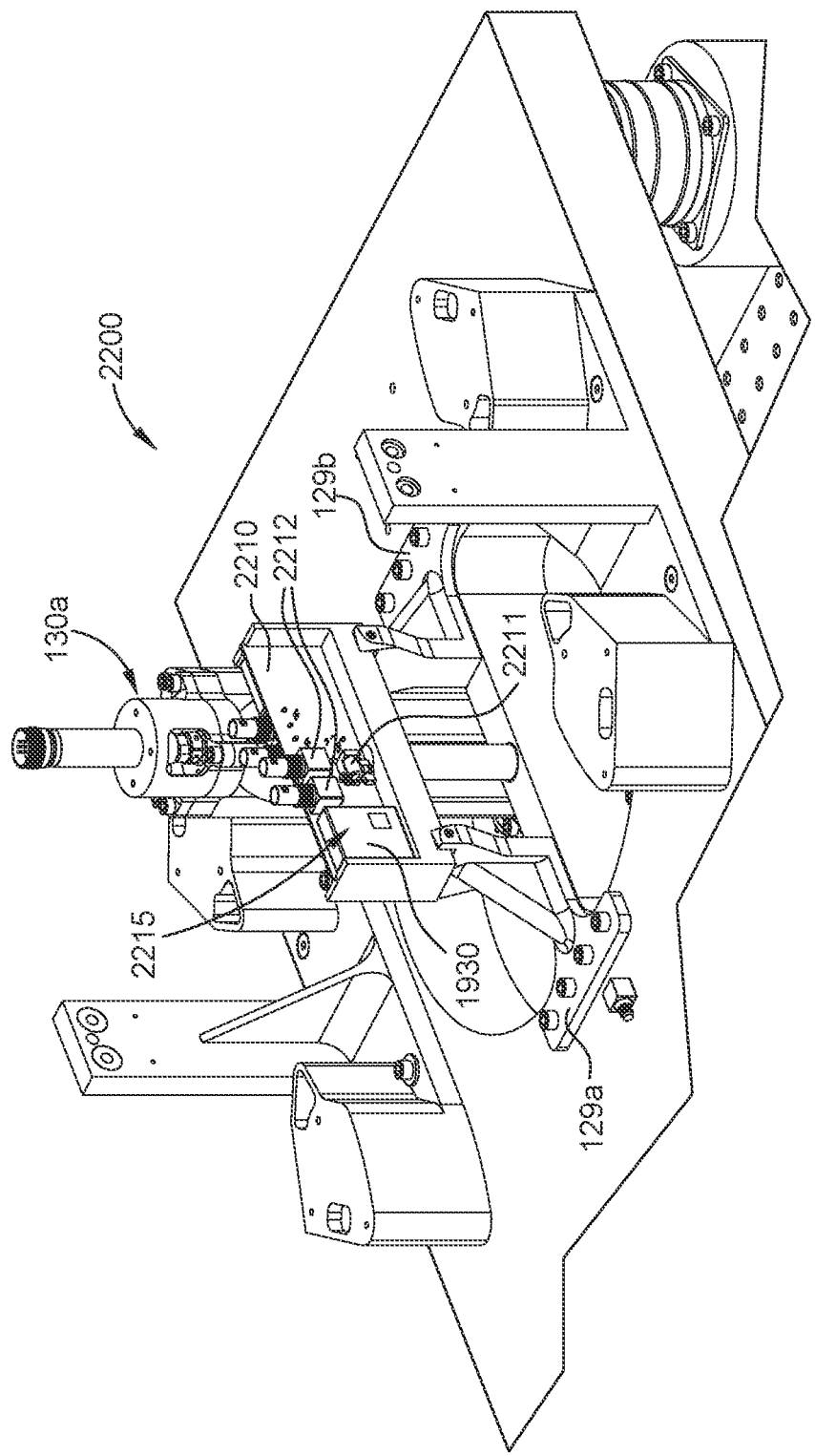
FIG. 22 is a schematic perspective front view of a testing apparatus that includes the central target arrangement shown in FIG. 19, according to one implementation.

FIG. 22 is a schematic perspective front view of a testing apparatus 2200 that includes the central target arrangement 1910 shown in FIG. 19, according to one implementation. The testing apparatus 2100 is similar to the testing apparatus 100 shown in FIG. 1A, and includes one or more of the aspects, features, components, operations, and/or properties thereof.

The CSAC 2215 that includes the cover 1930 (which houses the target atom 1911 and the detector 1920) is mounted to a circuit board 2210. A power supply 2211 is mounted to the circuit board 2210. A plurality of data outputs 2212 are mounted to the circuit board 2210. The second spinner tower 130b is not shown in FIG. 22 for clarity purposes. The CSAC 2215 (that includes the cover 1930, the target atom 1911, and the detector 1920), the power supply 2211, and the data outputs 2212 can be duplicated, and the duplications can be mounted to the back side of the circuit board 2210.

Figure 23:
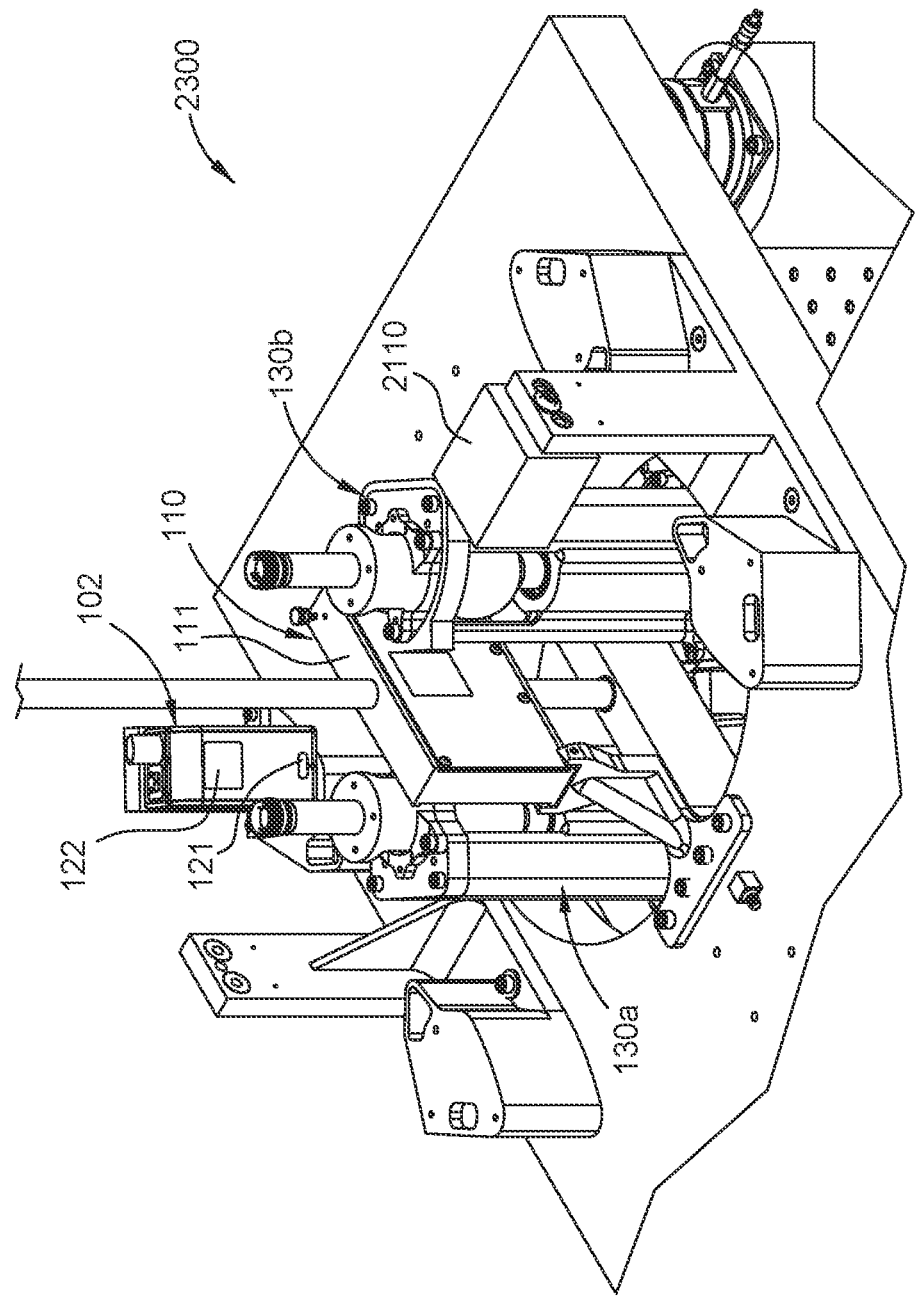
FIG. 23 is a schematic perspective front view of a testing apparatus, according to one implementation.

FIG. 23 is a schematic perspective front view of a testing apparatus 2300, according to one implementation. The testing apparatus 2300 is similar to the testing apparatus 100 shown in FIG. 1A, and includes one or more of the aspects, features, components, operations, and/or properties thereof. The testing apparatus 2300 is similar to the testing apparatus 2100 shown in FIG. 21, and includes one or more of the aspects, features, components, operations, and/or properties thereof.

In the implementation shown in FIG. 23, the detector 102 is moved relative to the position of the detector 102 shown in FIG. 21. In FIG. 23, the detector 102 is offset at an oblique angle relative to the target housing 111 of the central target arrangement 110. The offset position of the detector 102 can be used to measure and/or verify the positions of the pair of masses 112a, 112b, the rotatable masses 131a, 131b, and/or the target 111 relative to each other, such as during a calibration operation prior to the spinning of the rotatable masses 131a, 131b. As an example, the detector 102 can be used to laser scan to detect the positions of the rotatable masses 131a, 131b to measure a distance between the rotatable mass 131a and the rotatable mass 131b, and/or to measure a distance between each rotatable mass 131a, 131b and each respective mass 112a, 112b. The position and/or distance determination(s) facilitate accurate force determination, such as accurate determination of the force differences. The detector 102 can be moved back to the position shown in FIG. 21 during the spinning of the rotatable masses 131a, 131b.

Figure 24:
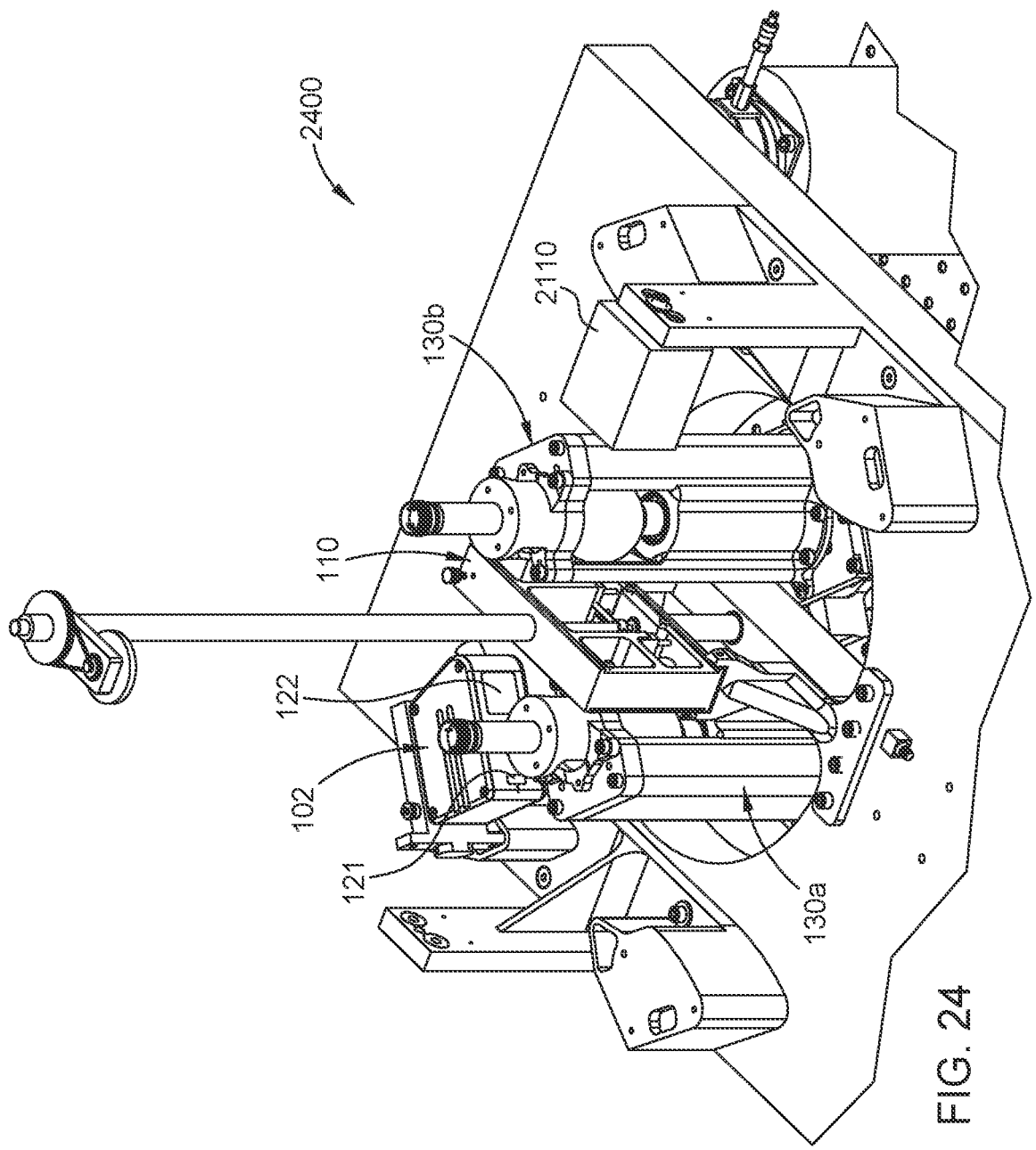
FIG. 24 is a schematic perspective front view of a testing apparatus, according to one implementation.

FIG. 24 is a schematic perspective front view of a testing apparatus 2400, according to one implementation. The testing apparatus 2400 is similar to the testing apparatus 100 shown in FIG. 1A, and includes one or more of the aspects, features, components, operations, and/or properties thereof. The testing apparatus 2400 is similar to the testing apparatus 2100 shown in FIG. 21, and includes one or more of the aspects, features, components, operations, and/or properties thereof. The testing apparatus 2400 is similar to the testing apparatus 2300 shown in FIG. 23, and includes one or more of the aspects, features, components, operations, and/or properties thereof.

In the implementation shown in FIG. 24, the detector 102 is mounted at an orientation rotated by 90 degrees (in a vertical plane) relative to the orientation shown in FIG. 23. The detector 102 is rotated such that the plane of the laser light emitted by the detector extends vertically as opposed to horizontally (such as in relation to FIG. 23, for example). The detector in FIG. 24 can be used to measure and/or verify the positions of the pair of masses 112a, 112b, the rotatable masses 131a, 131b, and/or the target 111 relative to each other, such as during a calibration operation prior to the spinning of the rotatable masses 131a, 131b.

In one or more embodiments, a vertical orientation of the detector 102 (shown, for example, in FIG. 23) can be used to determine X-positions of components (such as the pair of masses 112a, 112b, the rotatable masses 131a, 131b, and/or the target 111) along the X-axis, and can be used to determine Y-positions of components along the Y-axis. Additionally, in one or more embodiments, a horizontal orientation of the detector 102 (shown, for example, in FIG. 24) can be used to determine Z-positions of components along the Z-axis.

Benefits of the present disclosure include accurately measuring forces between objects (including attractive forces due to a radial dilation effect), reducing interferences of measurements by environmental factors, simplicity and efficiency of measurements, and modularity of measurements in a variety of positions and a variety of conditions. As an example, the independent mounting and independent movements of the central target arrangement 110 and the rotatable masses 131a, 131b facilitates at least partially isolating movements (such as vibrations) of the rotatable masses 131a, 131b from the central target arrangement 110.

It is contemplated that one or more of the aspects disclosed herein may be combined. Moreover, it is contemplated that one or more of these aspects may include some or all of the aforementioned benefits. As an example, it is contemplated that one or more aspects, features, components, operations, and/or properties of the testing apparatus 100, the controller 190, the difference in position shown in FIGS. 17A and 17B, the graph 1800, the central target arrangement 1910, and/or the method 2000 may be combined.

The present disclosure contemplates that terms such as "couples," "coupling," "couple," and "coupled" may include welding, interference fitting, and/or fastening such as by using bolts, threaded connections, and/or screws. The present disclosure contemplates that terms such as "couples," "coupling," "couple," and "coupled" may include direct coupling and/or indirect coupling.

The present disclosure contemplates a variety of sizes and/or scalings can be used for the implementations and aspects described herein.

It will be appreciated by those skilled in the art that the preceding implementations are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the implementations described herein may be substituted in for one or more of the other aspects described. The scope of the disclosure is determined by the claims that follow.

We claim:

1. A testing apparatus, comprising:
    a central target arrangement comprising:
        a pair of masses, and
        a target coupled to the pair of masses;
    a detector configured to recognize the target;
    a stage;
    a first spinner tower comprising a first rotatable mass, wherein the first rotatable mass is supported independently of the target and the pair of masses; and
    a second spinner tower comprising a second rotatable mass, wherein each of the first spinner tower and the second spinner tower respectively comprises:
        a tower housing coupled to a tower base, wherein the respective first rotatable mass or second rotatable mass is received within the tower housing, and
        an electric motor mounted to the tower housing, the electric motor configured to rotate the respective first rotatable mass or second rotatable mass relative to the tower housing at a rotation speed.

2. The testing apparatus of claim 1, wherein the first rotatable mass is rotatable about a central axis thereof, and the central target arrangement further comprises a target housing, wherein the pair of masses are disposed within the target housing, the target is disposed within the target housing, and the first rotatable mass is disposed outside of the target housing of the central target arrangement.

3. The testing apparatus of claim 1, wherein at least a part of the first rotatable mass has a spherical shape.

4. The testing apparatus of claim 1, wherein at least a part of the first rotatable mass has a cylindrical shape.

5. The testing apparatus of claim 1, further comprising a second rotatable mass supported independently of the target and the pair of masses, wherein the first rotatable mass is disposed on a first side of the target and the second rotatable mass is disposed on a second side of the target, and the second side is opposite of the first side.

6. The testing apparatus of claim 5, wherein each of the pair of masses, the first rotatable mass, and the second rotatable mass is formed of a non-magnetic material that includes tungsten.

7. The testing apparatus of claim 1, wherein the target includes a pendulum suspended from a wire and an optical structure mounted to the pendulum, and the detector is an optical detector configured to emit light toward the optical structure and receive reflected light that is reflected from the optical structure.

8. The testing apparatus of claim 7, wherein the pendulum is coupled to the pair of masses to move the pendulum upon movement of the pair of masses.

9. The testing apparatus of claim 1, wherein the target includes a target atom that is configured to oscillate, and the detector is configured to detect an oscillation frequency of the target atom.

10. The testing apparatus of claim 9, wherein the target atom and the detector are part of a chip-scale atomic clock (CSAC), the CSAC operable to determine an oscillation frequency of the target atom.

11. The testing apparatus of claim 1, wherein the rotation speed is greater than 1,000 rotations-per-minute.

12. The testing apparatus of claim 11, wherein the rotation speed is greater than 5,000 rotations-per-minute.

13. The testing apparatus of claim 1, wherein the stage comprises:
    a stage base configured to raise and lower a stage block;
    a rotary pedestal coupled to the stage block and configured to rotate relative to the stage block;
    a first movable tray movably coupled to the rotary pedestal; and
    a second movable tray movably coupled to the rotary pedestal,
    wherein the first and second movable trays are respectively coupled to the tower bases of the first and second spinner towers.

14. The testing apparatus of claim 1, further comprising:
    a base; and
    a table mounted to the base through a plurality of columns, the table comprising a first opening, a second opening, and a beam separating the first opening and the second opening,
    wherein the central target arrangement further comprises a target housing mounted to the table above the beam, the stage is mounted to the base, and the stage is positioned inwardly of the plurality of columns,
    wherein the first spinner tower is coupled to the stage and extending through the first opening on a first side of the target housing, and
    wherein the second spinner tower is coupled to the stage and extending through the second opening on a second side of the target housing, and wherein the target housing is mounted to the table through one or more brackets coupled to the table and a rod extending into the beam.

15. A testing apparatus, comprising:
    a base;
    a table mounted to the base through a plurality of columns, the table comprising a first opening, a second opening, and a beam separating the first opening and the second opening;

a stage mounted to the base, the stage positioned inwardly of the plurality of columns;
a central target arrangement comprising:
   a pair of masses,
   a target coupled to the pair of masses, and
   a target housing mounted to the table above the beam through one or more brackets coupled to the table and a rod extending into the beam;
a detector configured to recognize the target;
a first spinner tower comprising a first rotatable mass, the first spinner tower coupled to the stage and extending through the first opening on a first side of the target housing, wherein the first rotatable mass is supported independently of the target and the pair of masses; and
a second spinner tower comprising a second rotatable mass, the second spinner tower coupled to the stage and extending through the second opening on a second side of the target housing.

16. The testing apparatus of claim 15, wherein the first rotatable mass is rotatable about a central axis thereof, wherein the pair of masses are disposed within the target housing, the target is disposed within the target housing, and the first rotatable mass is disposed outside of the target housing of the central target arrangement.

17. The testing apparatus of claim 15, wherein at least a part of the first rotatable mass has a spherical shape.

18. The testing apparatus of claim 15, wherein at least a part of the first rotatable mass has a cylindrical shape.

19. The testing apparatus of claim 15, further comprising a second rotatable mass supported independently of the target and the pair of masses, wherein the first rotatable mass is disposed on a first side of the target and the second rotatable mass is disposed on a second side of the target, and the second side is opposite of the first side.

20. The testing apparatus of claim 19, wherein each of the pair of masses, the first rotatable mass, and the second rotatable mass is formed of a non-magnetic material that includes tungsten.

21. The testing apparatus of claim 15, wherein the target includes a pendulum suspended from a wire and an optical structure mounted to the pendulum, and the detector is an optical detector configured to emit light toward the optical structure and receive reflected light that is reflected from the optical structure.

22. The testing apparatus of claim 21, wherein the pendulum is coupled to the pair of masses to move the pendulum upon movement of the pair of masses.

23. The testing apparatus of claim 15, wherein the target includes a target atom that is configured to oscillate, and the detector is configured to detect an oscillation frequency of the target atom.

24. The testing apparatus of claim 23, wherein the target atom and the detector are part of a chip-scale atomic clock (CSAC), the CSAC operable to determine an oscillation frequency of the target atom.

25. The testing apparatus of claim 15, wherein each of the first spinner tower and the second spinner tower respectively comprises:
   a tower housing coupled to a tower base, wherein the respective first rotatable mass or second rotatable mas is received within the tower housing, and
   an electric motor mounted to the tower housing, the electric motor configured to rotate the respective first rotatable mass or second rotatable mass relative to the tower housing at a rotation speed,
   wherein the rotation speed is greater than 1,000 rotations-per-minute.

26. The testing apparatus of claim 25, wherein the rotation speed is greater than 5,000 rotations-per-minute.

27. The testing apparatus of claim 15, wherein the stage comprises:
   a stage base configured to raise and lower a stage block;
   a rotary pedestal coupled to the stage block and configured to rotate relative to the stage block;
   a first movable tray movably coupled to the rotary pedestal; and
   a second movable tray movably coupled to the rotary pedestal,
   wherein the first and second movable trays are respectively coupled to tower bases of the first and second spinner towers.

* * * * *